US011553805B2

(12) United States Patent
Gady et al.

(10) Patent No.: US 11,553,805 B2
(45) Date of Patent: Jan. 17, 2023

(54) PRODUCT SHOWCASE SYSTEM

(71) Applicant: Apple Inc., Cupertino, CA (US)

(72) Inventors: Jean-Marc Gady, Los Altos, CA (US); Kameron Gad, San Francisco, CA (US); Martynas Laurita, San Jose, CA (US); Oladapo Onikuyide, San Francisco, CA (US); Jake A. Nelson, Berkeley, CA (US); Adrian E. Magrina, San Francisco, CA (US); Stephen Yustiono, Sunnyvale, CA (US); Colin E. Murphy, Portland, ME (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 17/127,816

(22) Filed: Dec. 18, 2020

(65) Prior Publication Data
US 2022/0192394 A1 Jun. 23, 2022

(51) Int. Cl.
*A47F 3/00* (2006.01)
*A47F 5/00* (2006.01)
(Continued)

(52) U.S. Cl.
CPC ............ *A47F 3/001* (2013.01); *A47F 5/0025* (2013.01); *A47F 11/10* (2013.01);
(Continued)

(58) Field of Classification Search
CPC .......... G06Q 30/0641; G06Q 30/0643; G06Q 30/0623; G06Q 30/0631; G06Q 30/02;
(Continued)

(56) References Cited

U.S. PATENT DOCUMENTS

| 2010/0048267 | A1* | 2/2010 | Lin ...................... H04M 1/0266 |
| | | | 455/575.8 |
| 2012/0226586 | A1* | 9/2012 | Paul ...................... G06Q 30/06 |
| | | | 705/26.61 |
| 2017/0038928 | A1* | 2/2017 | Park ...................... G06V 40/10 |

(Continued)

FOREIGN PATENT DOCUMENTS

| CN | 201084376 Y | 7/2008 |
| EP | 2587436 A2 | 5/2013 |

(Continued)

OTHER PUBLICATIONS

International Search Report and Written Opinion of the International Searching Authority issued in Application No. PCT/US2021/060509, dated Mar. 11, 2022, 13 pages.

*Primary Examiner* — Koosha Sharifi-Tafreshi
(74) *Attorney, Agent, or Firm* — Sterne, Kessler, Goldstein & Fox P.L.L.C.

(57) ABSTRACT

Systems disclosed herein are directed to a display fixture having a display surface, dynamic input blocks disposed along the display surface, and a display screen positioned on the display surface next to the dynamic input blocks. Each of the dynamic input blocks displays content associated with a product. In response to a user interaction with one of the dynamic input blocks, the display screen displays content related to the product associated with the one dynamic input block. The content and associated products displayed on the dynamic input blocks automatically change in response to an external input.

27 Claims, 13 Drawing Sheets

(51) Int. Cl.
*A47F 11/10* (2006.01)
*F21V 33/00* (2006.01)
*G06F 3/147* (2006.01)
*F21W 131/405* (2006.01)

(52) U.S. Cl.
CPC .......... *F21V 33/0012* (2013.01); *G06F 3/147* (2013.01); *F21W 2131/405* (2013.01)

(58) Field of Classification Search
CPC ............ G06Q 30/0241; G06Q 30/0251; G06F 3/0482; G06F 3/0481; G06F 3/04812; G06F 3/04815; G06F 3/04817; G06F 3/0483; G06F 3/0484; G06F 3/04842; G06F 3/04845; G06F 3/04847; G06F 3/017; G06F 3/048; G06F 16/583; G06F 3/1446; G06F 3/147; H04N 5/232933; H04N 21/812; H04N 21/23424; H04N 21/4316; G09F 19/22; G09F 27/00; G09F 23/06; G09F 9/3026; G07F 9/023; G07F 9/02; G09G 2300/026
USPC .......... 345/1.1, 1.3; 715/761, 810, 825, 840, 715/835, 841, 836, 837, 838, 839, 842, 715/843, 854, 853, 855, 700
See application file for complete search history.

(56) References Cited

U.S. PATENT DOCUMENTS

2017/0308210 A1    10/2017  Brugger et al.
2021/0089177 A1*    3/2021  Cho ....................... G06Q 30/02

FOREIGN PATENT DOCUMENTS

WO    WO2007/141675 A1    12/2007
WO    WO2012/098518 A1    7/2012

* cited by examiner

PRODUCT SHOWCASE SYSTEM

FIELD

The described embodiments relate generally to a product showcase system, including display fixtures for displaying and promoting products to customers in a retail environment. More particularly, embodiments relate to interactive display fixtures that encourage customers to access, interact with, and learn about different products including for example both hardware- and software-related products.

BACKGROUND

Retail stores sell products that may be physical, digital, or combinations of the two. Retailers utilize various techniques to engage customers and to encourage them to interact with their products. Systems are needed for better showcasing products in physical retail environments.

SUMMARY

Some embodiments described herein relate to a display fixture for showcasing products in a retail environment. The display fixture comprising a display surface, dynamic input blocks disposed along the display surface, and a display screen positioned on the display surface next to the dynamic input blocks. Each of the dynamic input blocks displays content associated with a product. In response to a user interaction with one of the dynamic input blocks, the display screen displays content related to the product associated with the content displayed by the one dynamic input block. The content and associated products displayed on the dynamic input blocks automatically change in response to an external input.

Some embodiments described herein relate to a display fixture for showcasing digital games in a retail environment. The display fixture includes dynamic input blocks, each associated with a different digital game, and each of the dynamic input blocks displays dynamic content associated with its associated digital game. The display fixture further includes a display screen positioned next to the dynamic input blocks. Upon a user selection of one the dynamic input blocks, the content of the selected dynamic input block changes to second content associated with its associated digital game, and the display screen displays third content associated with the associated digital game. At least one of the dynamic input blocks can be used to control at least a portion of the third content.

Some embodiments described herein relate to a product showcase system for showcasing products available for purchase in a retail environment. The product showcase system includes a display fixture including a display surface and dynamic input blocks that are distinct from one and other and are disposed along the display surface. Each of the dynamic input blocks is associated with a different purchasable product and is configured to display a first content and a second content. The first content and the second content are related to the purchasable product associated with their respective dynamic input block. The first content and the second content are different from each other. The first content is a default display of its respective dynamic input block. In response to a user interaction with one of the dynamic input blocks, the first content displayed on the interacted-with dynamic input block is replaced with the second content.

Some embodiments described herein relate to a product showcase system for showcasing products in a retail environment. The product showcase system comprising a display fixture including a display surface and dynamic input blocks shaped as buttons and arranged in a matrix along the display surface. Each dynamic input block includes a display configured to variably display first and second content associated with one or more of the products in response to user interaction; a lens that protrudes through and out from the display surface such that a perimeter face of the lens is visible, wherein the perimeter face is configured to emit light to highlight the respective dynamic input block; and a sensor configured to detect the user interaction. The product showcase system further comprising a display screen positioned on the display surface next to the matrix. The display screen is configured to display content related to the one or more products associated with the dynamic input blocks.

Some embodiments described herein relate to a method of showcasing products. The method comprising displaying main content on a display screen of a display fixture and displaying multiple different secondary contents on multiple dynamic input blocks of the display fixture. The method further comprising sensing user input relative to a selected one of the dynamic input blocks and changing, in response to the sensed user input, the secondary content on the selected input block from first secondary content to second secondary content associated with the first secondary content. The method further comprising changing, in response to the sensed user input, the main content from first main content to second main content corresponding to the secondary content of the selected dynamic input block.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
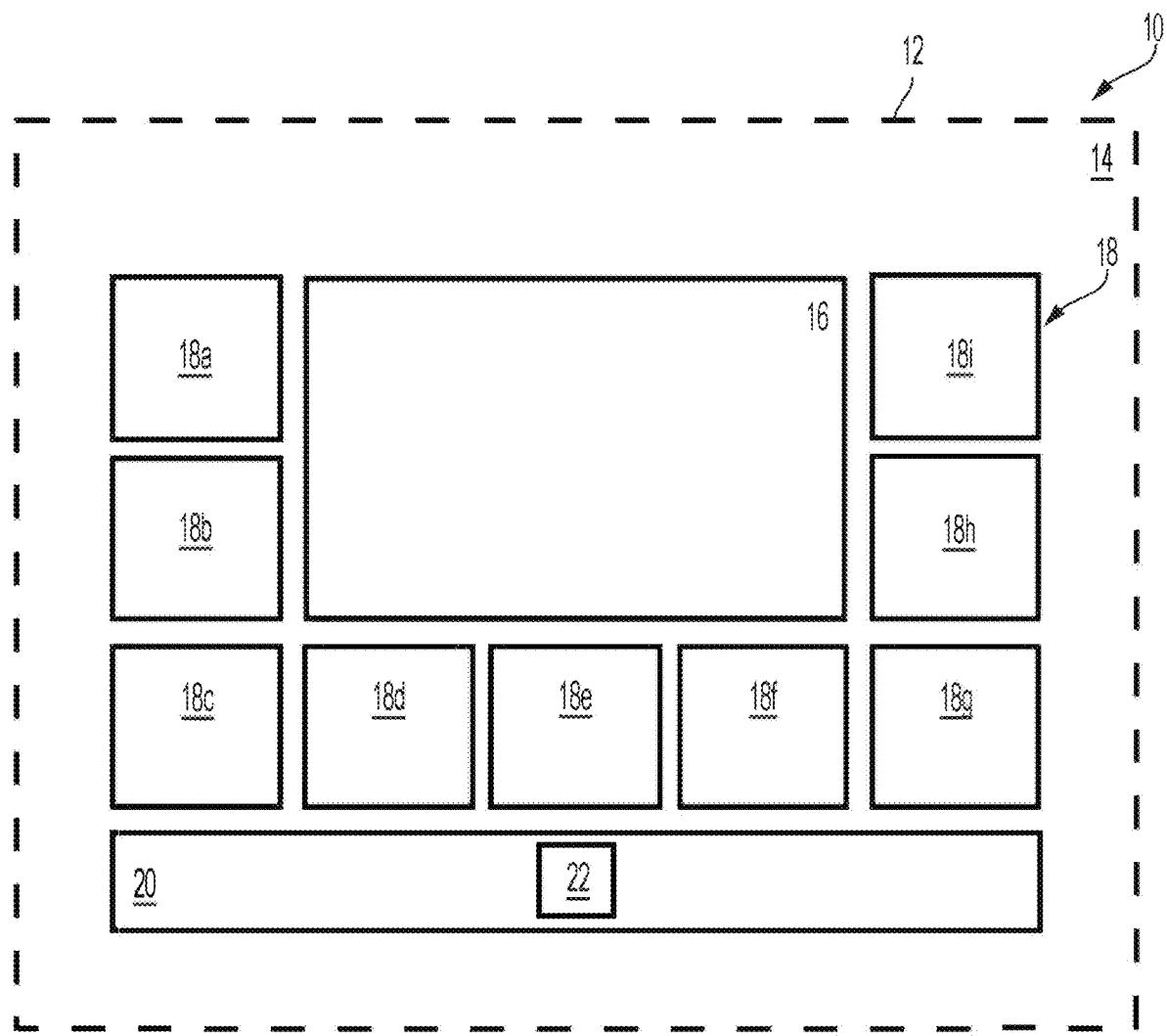
FIG. 1 shows a schematic view of an example product showcase system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "an embodiment," "embodiments," etc., indicate that the embodiment described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

Brick and mortar retail stores, such as consumer electronics stores, sell a variety of products. Products, as used herein can include digital products, physical products, and services. Digital products, for example, include software including but not limited to digital applications directed to games, music, videos, fitness, etc., operating systems, and the like; and services, including subscription services, directed to games, music, videos, fitness and the like. Such digital products may be downloadable and/or purchasable. Physical products, for example, include hardware including but not limited to devices such as phones, tablets, computers, etc. In some embodiments described herein, reference may be made to specific types of products, such as games. Reference to any particular product is for explanation purposes only and the features described should be understood as not limited to the particular referenced product. Physical products may be showcased via any of the product showcase systems discussed herein as described for digital products, and vice versa. Further, the terms customers, consumers, and users as used herein, may include persons that buy products from a retail store but is not limited to such persons and may include any individuals that may interact with the various product showcase systems described herein. Customer, consumer, and user may be used interchangeably.

Retailers may utilize various techniques to engage customers and to encourage them to interact with and learn about these products. Physical products may for example be stored in a display or be placed on surfaces or mounts so that a consumer can pick up and play with the physical device. Digital products may for example be presented on a graphic panel, or be displayed via a television, monitor or projector. They may also be displayed on a screen of one or more physical devices being offered for sale. Digital products for example can be presented in a static or dynamic format. In some cases, the digital products may be presented as images while in other cases they may played via a video loop. These techniques allow retailers to define what digital products are showcased, but do not allow direct user interaction with the digital products. In other cases, digital products may be pre-loaded on display-model devices (e.g., smartphones, tablets, or the like). This technique allows for direct user interaction with digital products. For example, a retailer may load a smartphone displayed on a showroom floor with a variety of applications (e.g., "apps"). Users may then interact with the actual applications by exploring the application icons on the smartphone.

Unfortunately, while these techniques can work well, they don't easily allow for configurability, flexibility, and variability. For example, there is limited opportunity to reconfigure or to adapt the showcased products to things like user interest or changing circumstances. Further, the digital products are often showcased at a small-scale on such display-model devices and thus can face challenges in drawing the attention of or immersively engaging customers.

The following disclosure provides systems and methods for showcasing products in a retail environment. More specifically, the systems and methods can display and promote products in a way that encourages customers to access, interact with, and learn about the products.

For example, a product showcase system may include a display fixture. The display fixture can be widely varied. The display fixture may for example be a physical structure incorporated into a wall unit or standalone unit within a retail store. The display fixture may promote a particular theme and include various parts or sections that each highlight different products associated with the theme. The display fixture may for example include one or more promotion areas that provide information about products, sample display areas that provide examples of the products themselves, and/or storage areas that contain merchandise associated with products. The promotion areas may include a theme, which may be a unifying or dominant characteristic or category associated with products. Examples include broad categories such as music, television, gaming, fitness, and home, but can also include product-specific categories such as phones, tablets, watches, computers, accessories, etc.

Using gaming as an example theme, the display fixture may include products used in gaming such as phones, tablets, controllers, games, applications, subscriptions and the like. Furthermore, the display fixture may try to promote how the various products are linked and how they can be used. The manner in which the products are laid out within the display fixture is to enhance the visibility of the products and their association with each other and to allow customers the ability to access, interact and learn about the products.

The display fixture may have dynamic input blocks that are configured to continuously display variable content in response to user input or interaction. The display fixture may also include supplemental devices such as tablets, smart phones, controllers, etc. The display fixture may showcase, automatically or as manually-defined, content (images, animations, videos, etc.) relating to products in a manner that both piques a customer's curiosity and encourages users to interact with the displayed content relating to the products. Such systems and methods provide users with an understanding of the breadth of the products and allow them to experience the products for themselves in a large-scale physical context.

Each dynamic input block may be capable of changing the content based a user interaction initiated by a customer and registered by the display fixture (e.g., via a sensor, detector, and/or camera). The user interaction may be initiated by touch, proximity, motion, gesture, gaze and the like. Additionally or alternatively, the user interaction may be initiated by using a product contained within the display fixture. Additionally or alternatively, the user interaction may be initiated by a user device (e.g., a user's personal smartphone). In any of these cases, when the display fixture registers the user interaction, the dynamic input block adjusts or manipulates its content to surprise and delight the customer thereby engaging them and helping them to discover what the showcased products have to offer.

Each dynamic input block may represent a different product and thus the display fixture may showcase the breadth of products available to users. For example, each dynamic input block may display content representing a product. Some or all dynamic input blocks may have different content and may be associated with different products relative to other dynamic input blocks within the same display fixture. The content may include images, animations, or videos that capture a user's attention. When a user interacts with a particular dynamic input block, the display screen may respond by displaying content associated with the product, or other material relating to the product showcased by the interacted with dynamic input block. As mentioned, user interaction may include touching the dynamic input blocks, gazing at the dynamic input blocks, gesturing at the dynamic input blocks, or exchanging information relative to the dynamic input blocks using devices.

The dynamic input blocks may include a call to action (e.g., a quick response (QR) code or link sent directly a user device using near field communication (NFC) technology), which may occur in response to user interaction with the dynamic input block. The call to action may invite yet more user interaction with the products showcased by the dynamic input blocks. For example, the call to action may allow the user to learn more about the product, use a demo of the product, download the product, or invite them to sign up for a subscription service that provides access to the product and other products.

The call to action may be bifurcated depending upon whether the user has already signed up for a subscription service, such as subscription service providing access to a variety of games. For example, if the user is already a subscriber to the subscription service, the user may be directed to a digital location to download the digital product pursuant to their subscription. If the user is not a subscriber, the user may be directed to a digital location that would invite them to subscribe to the subscription service or directly purchase the digital product.

The dynamic input blocks may be large-scale physical manifestations of digital icons. That is, the dynamic input blocks may be shaped to resemble digital icons (e.g., square with rounded corners) and may include images that further give the appearance of digital icons. For example, dynamic input blocks may be large-scale three dimensional (3D) of shaped, proportioned, and arranged within the display fixture in a manner that a user would associate with comparatively small-scale application icons on the home screen of a smartphone, smartwatch, tablet computer, etc. Dynamic input blocks that are analogous to digital icons but at a comparatively larger scale may bring the digital icons to life and/or give the user the impression of being shrunk down into the digital world. The dynamic input blocks may form large-scale buttons. The shape and large-scale nature of the button may attract users to the button and evoke a desire to push the button.

The display fixture may further include a display screen. The display screen may display content associated with available products showcased by the display fixture. The display screen may cooperate with the dynamic input blocks. For example, the display screen may automatically cycle through content from or otherwise relating to various products showcased on dynamic input blocks surrounding the display screen. In so doing, a user may become interested in the display fixture by content showcased on the display screen and may investigate that content further by interacting with the dynamic input block displaying that content. The dynamic input block or supplemental device associated with the content showcased on the display screen may be lit up or make a sound to more clearly invite the user to further investigate the products.

The display screen may display content as a result of user interaction with a dynamic input block or supplemental device. For example, in response to user interaction with a particular dynamic input block the display screen may display content associated with the interacted-with dynamic input block to highlight or amplify features of the digital content.

The supplemental devices may provide additional or alternative avenues for the user to interact with showcased products. For example, the supplemental devices may include a smartphone or tablet. In response to user interaction with an input block displaying content from a particular product, the display fixture may selectively illuminate or otherwise direct the user to a smartphone or tablet that has the interacted-with product loaded and featured for the user. Similarly, in response to content from a particular product displayed on the display screen the display fixture may selectively illuminate or otherwise direct the user to a smartphone or tablet that has the product loaded and featured for the user.

The supplemental devices may include a node that may allow the user to quickly and/or securely communicate with the product showcase system using their user device. For example, the node may establish an interface with the user device using, e.g., NFC, Bluetooth, Wi-Fi, or other similar technologies. The interface established with the node and the user device may allow the user to, for example, take over the product showcase system to play a game.

A retailer may adapt the product showcase system in a number of ways. For example, the product showcase system can be configured to update content remotely or set to automatically change in response to circumstances or events. To feature a new product that was just released, the retailer may update the product showcase system so that all dynamic input blocks appear as icons for and are associated with that same product. If a retailer wants to feature a certain type of product, say, game-related applications, the retailer may update the product showcase system so that each dynamic input block appears as an icon for and is associated with a different game-related application. Further, the call to action from the dynamic input blocks may be dynamically updatable. For example, a displayed QR code may be updatable.

The product showcase system can be configured to update dynamically in response to circumstances. For example, the dynamic input blocks of the product showcase system may always appear as icons for the top (e.g., the top 12) most-downloaded applications in an applications database. Or they may appear as icons for applications related to top news stories of the day or other trending topics.

The product showcase system can be configured to utilize user data to create a personalized user experience. For example, one of the supplemental devices of the display fixture (e.g., a tablet, smartphone, or node that interacts with a user's user device) may allow the user to customize the display fixture to reflect user preferences.

The product showcase system can be configured such that the dynamic input blocks appear as icons for products that are tailored to a particular user. For example, the product showcase system may sense that a particular user is nearby (e.g., by the location of that user's smartphone or other user device), and may automatically change its dynamic input blocks to appear as icons for products that are tailored to that user. For example, the products may be similar to other products that the user has previously downloaded, suggested for the user (based, e.g., on a recommendation algorithm), or based on other information about the user (e.g., demographic information).

The product showcase system can be configured such that when there are multiple users nearby (e.g., within the same retail store as the product showcase system), the product showcase system may automatically change its dynamic input blocks to appear as icons for products that are tailored to common characteristics of the multiple users' data, or it may change some of its dynamic input blocks to be tailored to one user, and others to one or more other users.

The product showcase system can be configured such that one or more of the display screen, the input blocks, and supplemental devices may be connected such that content can run between multiple devices of display fixture. For example, the dynamic input blocks and display screen may display common content associated with a product. One dynamic input block may provide access for a first user to the common content and another dynamic input block may provide access for a second user to the common content. The display screen may show views of users interacting with the common content on dynamic input blocks. In such a configuration, the devices of the display fixture may together be used in a game. For example, each dynamic input block may provide different points of view for a single game and display screen may display highlights of the game, one or more global views of the game, and/or cycle between points of view of various input blocks.

These and other embodiments are discussed below with reference to FIGS. 1-13. Those skilled in the art will readily appreciate that the detailed description given herein with respect to these figures is for explanatory purposes only and should not be construed as limiting.

FIG. 1 illustrates a schematic view of an example product showcase system 10. The product showcase system 10 is configured to encourage customers to access, interact with, and/or learn about different products.

Product showcase system 10 may include a display fixture 12 that may be positioned at a location within a retail store. The retail store may for example be a brick and mortar consumer electronic store. Display fixture 12 is a physical structure such as a wall unit or table that may be built into or attached to a structure (e.g., wall, floor, window, etc.) of the retail store. Additionally or alternatively, display fixture 12 may be a standalone structure positioned within the retail store. In some cases, display fixture 12 may be modular unit that is situated within a larger assembly that includes multiple fixtures. Example larger assemblies can be found in U.S. Pat. No. 9,936,826, issued Apr. 10, 2018, titled "Modular Wall System for Displaying a Product," which is herein incorporated by reference in its entirety.

Display fixture 12 may promote a particular theme and include various parts or sections that each highlight different products (e.g., digital products) associated with the theme. The theme may be a unifying or dominant characteristic or category associated with products. Examples include broad categories such as, music, television, gaming, health, fitness, and home, but can also include product specific categories. Using gaming as an example, display fixture 12 may include products used in gaming such as phones, tablets, controllers, games, applications, subscriptions and the like. Furthermore, display fixture 12 may try to promote how the various products are linked and how they can be used. The manner in which the products are laid out within display fixture 12 is configured to enhance the visibility of the products, the association of products with each other, and/or to allow customers the ability to access, interact with, and learn about the products.

Display fixture 12 may include one or more promotion areas 14 that provide information about products and are configured to encourage user interactions. Promotion area 14 may be positioned anywhere in display fixture 12. Promotion area 14 may be featured prominently to promote visibility, access and interactions with customers. For example, promotion area 14 may be positioned at the center and/or upper sections of display fixture 12.

Display fixture 12 may include a plurality of dynamic input blocks 18 are configured to display variable content and capable of changing the content based on user interaction. Content, as used herein, may include images, animations, videos, live action, effects, operating systems, and the like. The dynamic input blocks may for example include an active display area provided by a variety of display technologies including but not limited to LED, LCD, OLED, and the like. The content itself may be widely varied.

In embodiments, the content may be associated with a product associated with display fixture 12. For example, the products may be associated with the theme of display fixture 12. By way of example, in the context of gaming, the content may be associated with digital games.

In some embodiments, dynamic input blocks 18 may be different from one another, i.e., each dynamic input block 18 may be associated with a different product. As a result, the content being displayed on each of dynamic input blocks 18 may be different. By way of example, in a gaming application, each dynamic input block 18 may represent a different game.

In other embodiments, some of dynamic input blocks 18 may be associated with the same content and/or product. For example, some dynamic input blocks 18 may be associated with the same product while other dynamic input blocks 18 may be associated with different products. As a result, the content displayed on some of dynamic input blocks 18 may be the same while others may be different. Nevertheless, it should be noted that even if some of dynamic input blocks 18 are associated with the same products, the content displayed thereon may be different or time shifted. By way of example, in a gaming application, some of dynamic input blocks 18 may be associated with the same game while other dynamic input blocks 18 may be associated with one or more different games.

In still other embodiments, all of dynamic input blocks 18 may be associated with the same product. As a result, the content displayed on all of the dynamic input blocks 18 may be the same. Nevertheless, it should be noted that even if some of dynamic input blocks 18 are associated with the same products, the content displayed thereon may be different or time shifted. For example, in a gaming application, dynamic input blocks 18 may all be associated with the same game. In some cases in which dynamic input blocks 18 are all associated with the same game, dynamic input blocks 18 may display the same or similar content. In other cases in which dynamic input blocks 18 are all associated with the same game, dynamic input blocks may display different content.

In embodiments, product showcase system 10 includes at least a first dynamic input block 18a and a second dynamic input block 18b that are each associated with a different product. In embodiments, product showcase system 10 may further include additional dynamic input blocks 18c-i that are either the same or different than dynamic input blocks 18a, 18b.

In embodiments, dynamic input blocks 18 may be placed in distinct groups. The groups may be placed in different locations within display fixture 12 (e.g., center, left, right, top, and/or bottom). In some cases, each of the groups may only contain dynamic input blocks 18 that are different from other dynamic input blocks 18 in their group. However, different groups may include dynamic input blocks 18 that are redundant with other groups. For example, product showcase system 10 may include a first group having a set of dynamic input blocks 18 that are positioned at a first location within display fixture 12, and a second group having the same set of dynamic input blocks 18, but that are positioned at a second location within display fixture 12. Alternatively, the first group may have a first set of dynamic input blocks 18 while the second group may have an entirely different set of dynamic input blocks 18. Alternatively, the first group may be different than the second group in that they have at least one dynamic input block 18 that is different.

The number of dynamic input blocks 18 within a group may be widely varied. In one embodiment, dynamic input blocks 18 are positioned within a matrix (e.g., 2×2, 2×3, 2×4, 3×3, 4×4, etc.). That is, dynamic input blocks 18 may for example be spaced apart and aligned in rows and columns thereby creating a symmetric look. In other cases, dynamic input blocks 18 may be spaced randomly thereby producing an asymmetric look. Each group may have the same or different layout. For example, a first group may have a first layout (e.g., 2×2) and the second group may have a second layout that is the same (e.g., 2×2). Alternatively, the first group may have a different layout than a second group (2×2, vs. 4×4). By way of example, product showcase system 10 as shown in FIG. 1 may include three groups defined respectively by 18*a*-18*c*, 18*d*-18*f*, and 18*i*-18*g*. Groups 18*a*-18*c* and 18*i*-18*g* may be provided in a 3×1 configuration and group 18*d*-18*f* may be provided in a 1×3 configuration.

Dynamic input blocks 18 may register and respond to user interaction with dynamic input blocks 18. User interaction with dynamic input blocks 18 may be initiated through touch, proximity, motion, gesture, gaze and the like. Additionally or alternatively, user interaction may be initiated by using a product (e.g., a smartphone provided by the retailer) contained within display fixture 12. Additionally or alternatively, user interaction may be initiated by using a user device, such as a user's own smartphone. In any of these cases, when the user performs a user interaction that is registered by product showcase system 10, dynamic input blocks 18 may adjust or manipulate content to surprise and delight the customer thereby deepening engagement with display fixture 12 and the products it has to offer. By way of example, dynamic input blocks 18 may change their content based on user interaction with dynamic input blocks 18.

Product showcase system 10 may include a subassembly 20 that manages customer interactions and that is configured to oversee the user interactions. Subassembly 20 may for example include one or more nodes 22 that serve as an interface between customers and product showcase system 10. Nodes 22 may for example be sensors such as touch sensors, proximity sensors, motion sensors, gesture sensors, gaze sensors, and/or or communication assemblies such as NFC, Bluetooth, Wi-Fi, etc.

In embodiments, product showcase system 10 may include a sensor such as a touch or proximity sensor to detect user interaction with one or more dynamic input block 18. The senor may be integral with dynamic input blocks 18. By way of example, the sensor may be touchscreens integrated into dynamic input blocks 18. Alternatively or additionally, product showcase system 10 may include a transceiver for communicating with a device of a user or one associated with product showcase system 10 (e.g., Bluetooth, etc.). By way of example, the transceiver may be a unit that is situated within display fixture 12. Transceiver may be situated within display fixture 12 in visible or hidden configurations. The sensor may be distinct from dynamic input blocks 18 and included elsewhere in the product showcase system 10, for example as a separate unit (e.g., mounted to or behind a wall of display fixture 12) or integrated into another part of product showcase system 10.

In embodiments, dynamic input blocks 18 may display a first content when in a nominal/default state and may display a second content in response to user interaction. For example, in the gaming implementation mentioned above, the first content may be an icon, glyph, or character associated with a game while the second content may be a video that showcases aspects of the game being played. By way of another example, in a music implementation the first content may be an album cover or an image of an artist while the second content may include audio and/or videos associated with the album/artist. Other analogous examples to promote TV, fitness, etc. may similarly be promoted using the product showcase system 10. In any of the above examples, in response to user interaction the change from the first and second content promotes better understanding of the product, which in turn helps draw the customer into the display fixture to learn more about the product.

In embodiments, dynamic input blocks 18 can be large, prominent 3D objects that may protrude out of a surface of display fixture 12. By way of example, the surface can be a back (e.g., vertical) wall of fixture 12 and/or a (e.g., horizontal) table surface. The prominence and 3D nature makes dynamic input blocks 18 more interactive and fun for the customer.

In embodiments, dynamic input blocks 18 may include a raised translucent member with a display screen disposed behind the translucent member. For example, translucent member may extend out of or protrude out of a surface of fixture 12 such that is has front and side surfaces.

In embodiments, dynamic input blocks 18 may further include a light effect that illuminates dynamic input blocks 18 themselves and/or an area around dynamic input blocks 18. For example, the light effect may be produced around dynamic input blocks 18 in the space between dynamic input blocks 18. In some cases, the light effect may be created by a light source within dynamic input blocks 18. In other cases, the light effect may be created by a light source found outside of dynamic input blocks 18. In some cases, the light effect may be generated by a light source that is different than a display screen of dynamic input blocks 18. In some cases, the light effect is always on, and in other cases, the light effect turns on based on an input. By way of example, the light effect may be used to highlight one of dynamic input blocks 18 such as for example a dynamic input block selected by the user.

In embodiments, the light effect may for example be edge lighting that illuminates areas adjacent to dynamic input blocks 18 to further enhance the three dimensionality of dynamic input blocks 18 and thus improve the user experience. The edge lighting may be created adjacent to outer edges of dynamic input blocks 18. In some cases, the edge lighting may extend peripherally around the entirety respective dynamic input blocks 18. In other cases, the edge lighting may be disposed at discrete locations around the periphery of respective dynamic input blocks 18.

In embodiments, dynamic input blocks 18 are shaped in form of a large button. The large button acts to entice the customer to use dynamic input blocks 18. The large button may for example be bigger than a hand (whereas a traditional button is typically smaller than a finger). The large button makes it seem like the customer is part of or within a control panel and thereby enhances the fun and interactivity. By way of example, in the gaming implementation mentioned above, dynamic input blocks 18 may be configured as a button associated with a graphical user interface (e.g., a menu screen) and/or a gaming controller. In one example, the dynamic input blocks represent gaming icons on a menu screen of a handheld electronic device. For example, dynamic input blocks 18 may be a 3D square with rounded corners.

In embodiments, display fixture 12 may further include a display screen 16 positioned relative to dynamic input blocks 18. For example, dynamic input blocks 18 may be positioned about or around display screen 16. By way of example, dynamic input blocks 18 may be positioned on the left, right, top, and/or bottom of display screen 15. In the example illustrated in FIG. 1, dynamic input blocks 18 are positioned to the left, right, and below display screen 16. Display screen 16 is configured to display content (e.g., a theme) associated with display fixture 12. In embodiments, the content that is displayed on display screen 16 may be associated with dynamic input blocks 18. For example, in gaming implementations display screen 16 as well as dynamic input blocks 18 may all provide content centered around gaming.

In embodiments, display screen 16 may be configured to display a main content while dynamic input blocks 18 are configured to display a secondary content. The main content may be associated with the secondary content of one of the dynamic input blocks 18a-i. For example, both the main content and the secondary content may be associated with the same product. Although associated, the main content may be different than the secondary content. For example, in the gaming implementation mentioned above, the main content may be a game being played (whether prerecorded or active) while the secondary content may be an image or video that showcases aspects of the game being played (e.g., icon, glyph, or character).

In embodiments, display fixture 12 includes a plurality of dynamic input blocks 18 and at least some of dynamic input blocks 18 are associated with different content and/or different products. For example, in the gaming implementation mentioned above, first dynamic input block 18a may be associated with a first gaming application while second input block 18b may be associated with a second gaming application.

In embodiments, a plurality of dynamic input blocks 18 are paired with display screen 16. Display screen 16 may be configured to display content associated with only one of dynamic input blocks 18 at a time. The content displayed on display screen 16 may be displayed on a loop or may be based on a user interaction with retail display fixture 12. For example, if a customer touches one of the dynamic input blocks 18, the touched dynamic input block may change from first to second content while display screen 16 may change to main content associated with the touched dynamic input block.

In embodiments, a first matrix of dynamic input blocks 18 is positioned to a first side of display screen 16 while a second matrix of dynamic input blocks 18 is positioned on a second side of display screen 16. For example, the first and second matrices may be positioned on opposites sides of display screen 16.

In embodiments, user interaction with the display fixture 12 includes touching one or more of dynamic input blocks 18. By way of example, dynamic input blocks 18 may have a touch sensor associated therewith.

In embodiments, user interaction with display fixture 12 includes the customer being proximate one of dynamic input blocks 18. By way of example, dynamic input blocks 18 may have a proximity sensor associated therewith. The customer may interact with dynamic input blocks 18 by simply hovering over one of dynamic input blocks 18.

In embodiments, user interaction with display fixture 12 includes looking at one of dynamic input blocks 18. By way of example, display fixture 12 may include a gaze detection system associated therewith.

In embodiments, user interaction with display fixture 12 includes moving in front of one of dynamic input blocks 18. By way of example, dynamic input blocks 18 may have a motion sensor associated therewith.

In embodiments, user interaction with display fixture 12 includes enabling the customer's user device to interact with display fixture 12. By way of example, dynamic input blocks 18 may change based on user settings/characteristics stored in their own user device. For example, if the customer likes card games then this data may be used to display card games on dynamic input blocks 18 and/or on display screen 16.

In embodiments, user interaction with display fixture 12 includes using a product contained within display fixture 12. By way of example, display fixture 12 may have a remote control that when used initiates predetermined content on dynamic input blocks 18 and/or on display screen 16.

In embodiments, user interaction with display fixture 12 includes using any combination of the above. For example, using a proximity and touch sensor, dynamic input blocks 18 may display a first content as the customer approaches and a second content when the customer touches it.

The following illustrative example of product showcase system 10 involves a gaming implementation. In nominal states, dynamic input blocks 18a-i may be configured to display icons associated with different gaming applications. Display screen 16 may be configured to display content associated with one of the gaming applications displayed by the dynamic input blocks 18a-i. Furthermore, product showcase system 10 may include sensors (e.g., touch sensors) configured to detect when a user selects one of dynamic input blocks 18a-i. For example, when approaching product showcase system 10, a user will see a plurality of icons associated with gaming applications displayed on dynamic input blocks 18a-i and a game being played on display screen 16. This configuration of dynamic input blocks 18a-i and display screen 16 may cause user to recognize that the game being played is associated with one of the icons, and as a result, may cause the user to intuitively determine that dynamic input blocks 18a-i represent inputs. This configuration of dynamic input blocks 18a-i and display screen 16 may encourage the user to engage with product showcase system 10. For example, the user may assess the icons displayed on dynamic input blocks 18a-i and decide which one they want to select. The user may make the selection as for example by pressing one of dynamic input blocks 18a-i displaying the icon of interest. While the user may select any of dynamic input blocks 18a-i, for explanatory purposes the user may select dynamic input block 18a. Once selected, the icon on dynamic input block 18a may change into content associated with the selected gaming icon (e.g., video), and the content being displayed on display screen 16 may change to content associated with the icon displayed on selected dynamic input block 18a. The content may be pre-recorded. The content on selected dynamic input block 18a may be tied to a small feature of the gaming application while the content on display screen 16 may provide a broader and larger view of the gaming application. For example, selected dynamic input block 18*a* may display a close up of a character in a game while display screen 16 may display the world or environment that surrounds the character. Moreover, one or both of the selected dynamic input block 18*a* or display screen 16 may include a QR code in the content such that the user (e.g., using their own device) can find out more about the game or even download the game. Thereafter, the user can select a different icon and learn about additional gaming applications in the same manner described above.

Figure 2:
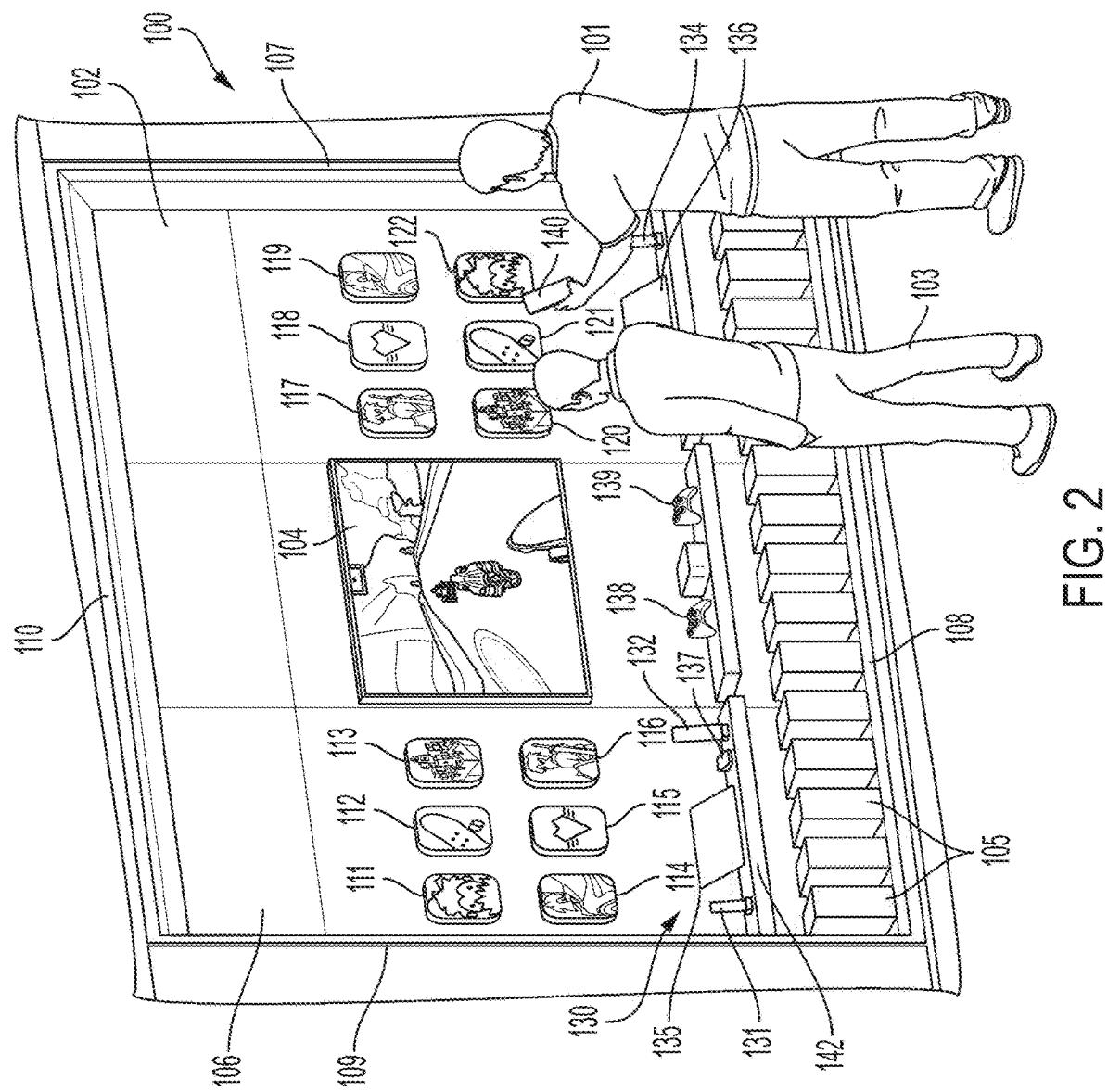
FIG. 2 shows a perspective view of another example product showcase system.
Figure 3:
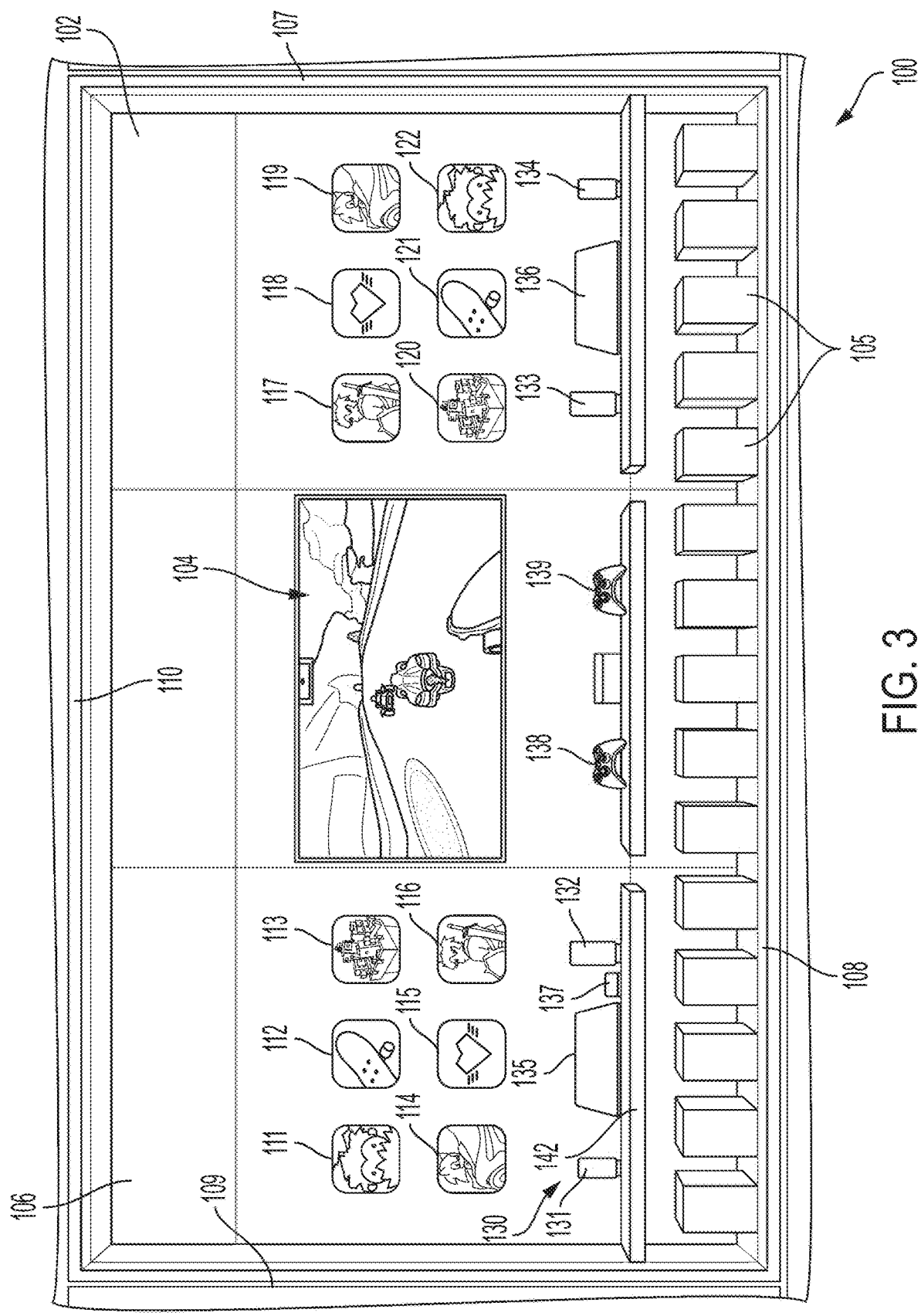
FIG. 3 shows a front view of the product showcase system.

FIGS. 2 and 3 respectively show a perspective and a front view of an example product showcase system 100 in accordance with aspects of the invention. Product showcase system 100 may include any of the features and/or functions of any of the above described product showcase system and vice versa.

Product showcase system 100 may include a display fixture 102 that blurs the line between physical and digital products to bring the digital products to life. Display fixture 102 may be a physical structure deployed in a retail environment. Display fixture 102 may include a display screen 104 mounted centrally on a display surface 106, which may be flanked by multiple dynamic input blocks 111-122. Display fixture 102 may include supplemental devices 130, such as smartphones 131-134, tablets 135, 136, a node 137, controllers 138, 139, etc.

Display fixture 102 may be a bay (e.g., set into a wall of a retail environment or freestanding in a retail environment) and display surface 106 may be a rear wall of the bay. Display fixture 102 may be a modular unit, in that it can be placed, for example, in a pre-defined space (for example, in a large recess extending along a wall of a retail environment) aside other similarly-configured modular units. Display fixture 102 may then be re-arranged with or take the place of such other modular units. Display surface 106 may be surrounded by four walls 107-110 projecting outwardly. Display fixture 102 may include a counter 142, which may be formed from one or more shelves. In some embodiments, display fixture 102 may also include packaged products 105 for sale.

In embodiments, display screen 104 is configured to display a main content while input block(s) 111-122 are configured to display a secondary content. The main content may be associated with the secondary content of one of the dynamic input blocks. Display screen 104 is configured to display main content associated with the secondary content of only one of the dynamic input blocks at a time. Although associated, the main content is different from the secondary content. For example, in a gaming implementation, the main content may be a game being played while the secondary content may be an image or video that showcases aspects of the game being played (e.g., an icon, glyph, or character).

The main content on display screen 104 associated with the secondary content of one of the dynamic input blocks may be displayed on a loop or based on a user interacting with retail display fixture 102. For example, if a customer touches one of the dynamic input blocks (e.g., one of dynamic input blocks 111-122), the touched dynamic input block may change from first to second content while the display screen may change to main content associated with the touched dynamic input block.

Display fixture 102 may utilize one or more of display screen 104, input blocks 111-122, and supplemental devices 130 to showcase, automatically or as manually-defined, content (e.g., any of images, animations, or videos) from or related to products in a manner that both catches the attention of users (e.g., users 101, 103) from afar and encourages users to directly interact with digital content.

For example, display screen 104 may display content (e.g., display screen content) from or associated with one of the showcased products to pique customer interest in and/or to provide an alternative view of digital content showcased on input blocks 111-122 flanking display screen 104. Having been engaged with display fixture 102, input blocks 111-122 may provide an opportunity for direct user interaction with showcased products and may facilitate interest in the product by the customer. Supplemental devices 130 may provide an opportunity for the user to easily sample full or demo versions of the products showcased on display screen 104 or input blocks 111-122, promoting yet further user interaction with the products. In so doing, display fixture 102 may provide users (e.g., users 101, 103) with an understanding of the breadth of the showcased products and may allow users to experience the products for themselves.

In embodiments, individual input blocks 111-122 may each represent different products and thus display fixture 102 may showcase the breadth of products available to users.

Dynamic input blocks 111-122 may be large prominent three-dimensional of that protrude out of a surface (e.g., display surface 106) within retail display fixture 102. Their prominence and three-dimensional nature makes display fixture 102 more interactive and fun for the customer. In some embodiments, dynamic input blocks 111-122 are in the shape of a large button. The large button acts to entice the user/consumer to use it. The large button may for example be bigger than a hand (whereas a traditional button is typically smaller than a finger). The large button makes it seem like the customer using it is part of or within a control panel, again enhancing the fun and interactivity of display fixture 102. By way of example, in a gaming implementation, the dynamic input blocks may be configured as buttons on a user interface (i.e., a gaming icon of a menu screen on a handheld electronic device). In one example, as shown in the figures, it may be a three-dimensional square with rounded corners.

As shown in detail in FIGS. 10 and 11 and discuss further below in reference to individual dynamic input blocks 411, in embodiments dynamic input blocks 111-122 (any or all of which may correspond to input blocks 411 discussed below) may each be a multiple piece constructions that may include electronics and a lens. Electronics may be or include a computer with a display screen that a user may interact with, such as a tablet. The lens may be provided over part or all of electronics. The lens may be translucent (e.g., transparent) and may have sufficient thickness to protrude through and out from display surface 106 disposed around lens. Lens may be made of, for example, glass, acrylic, plastic, or any other suitably-transmissive material. The electronics and lens together may give input block 3D properties (e.g., may together form an object, such as a button, with a specific thickness) while also providing an actionable display. The electronics and lens together may bring dynamic input blocks 111-122 to life for the user, i.e., to trigger the user's curiosity and promote interaction with the dynamic input blocks 111-122. The lens and/or electronics may include a sensor (e.g., a pressure sensor or other sensor such as a thermal sensor) that detects user interaction (e.g., a user's touch). The lens and/or electronics may signal to attract a user to dynamic input blocks 111-122 and/or to enhance the impression that dynamic input blocks 111-122 are each real-life icons that are analogous to a digital icon. Dynamic input blocks 111-122 may protrude from the rear of display surface 106 through display surface 106 such that lens, but and not electronics, are visible to a user. That is, electronics may be hidden behind display surface 106 of the product showcase system 100 in which it is installed. For example, lens may protrude out from display surface 106 of display fixture 102, such that a perimeter face of lens is visible.

In embodiments, perimeter face may glow or otherwise emit light, helping to give input block a defined and highlighted appearance. Bordering lenses of dynamic input blocks 111-122 in this way, extending out from display surface 106, this light effect highlights each individual input block and helps to define its character as a fun, three-dimensional dynamic button in an immersive user interaction. Dynamic input blocks 111-122 may be spaced apart from each other such that the light effect of each individual input block is distinct and does not interrupt the light effect of adjacent input blocks.

In some embodiments, dynamic input blocks 111-122 may include LEDs situated such that light emitted from the LEDs may shine through perimeter face of lens to attract a user. For example, such LEDs (or other light source) may be a part of electronics. Other signals, such as audio or haptic signals, may also be emitted from dynamic input blocks 111-122. For example, when a user indicates selection of or interest in a dynamic input blocks (e.g., by touching a selected dynamic input block) dynamic input block may emit a sound (or cause another element of its display fixture to emit a sound) or provide haptic feedback (e.g., vibration feeling like a click or a button-press) indicating its selection.

In embodiments in which display fixture 102 includes a plurality of dynamic input blocks, at least some of the dynamic input blocks may each be associated with different content. For example, in a gaming implementation, a first dynamic input block may be associated with a first gaming application while a second dynamic input block may be associated with a second gaming application. In some cases, two or more dynamic input blocks 111-122 may be positioned in a matrix or array where they are spaced apart in rows and columns. For example, they may be positioned in a grid such as 2×2, 2×4, 4×4, 2×6, 4×6, etc. In some cases, there may be groups of matrices. For example, a first matrix on a first side of display screen 104 and a second matrix on a second side of display screen 104. For example, the first and second matrices may be positioned on opposite sides of display screen 104. Dynamic input blocks within each of the matrices may display different content. However, when multiple matrices are used some dynamic input blocks may display similar or the same content.

As shown in the example of FIG. 2, input blocks 111-122 showcase six different products across twelve input blocks 111-122. In so doing, display fixture 102 may showcase the same suite of products to multiple users (e.g., users 101, 103) standing to the left and right of display screen 104. In the example shown in FIGS. 2 and 3, display fixture 102 includes six input blocks 111-116 flanking display screen 104 to the left and each featuring six different products and six input blocks 117-122 flanking display screen 104 to the right each featuring the same six products as input blocks 111-116 flanking display screen 104 to the left. It should be understood, however, that this arrangement is just an example. Different numbers or combinations of products may be shown, and the left and right sides need not showcase the same set of products. Further, the products showcased need not all be digital, or all physical. For example, one or more input blocks in the a display fixture may showcase products while one or more other input blocks in the same display fixture may showcase physical products.

The content and associated products displayed on display fixture 102 (i.e., on one or more of display screen 104, input blocks 111-122, supplemental devices 130, etc.) may be defined by or automatically change in response to an external input such that the products displayed may be applications catered to the specific external input. The external input may include, for example, one or more of a geographical location of display fixture 102, user data transmitted from one or more users (e.g., users 101, 103) located in proximity to display fixture 102, a ranking of the most-downloaded products (e.g., as download from an applications database at a particular moment in time), among others.

In embodiments, the content and associated products displayed on display fixture 102 may be defined based on any input. For example, content may be updated remotely or set to automatically change in response to circumstances or events (e.g., dynamic external input). For example, the retailer may define which external input display fixture 102 automatically changes in response to. As just a few examples, the retailer may set the content and associated products displayed on display fixture 102 based on the most downloads, new releases, advertising, and/or sponsorships.

Additionally or alternatively, to feature a new application that was just released, the retailer may update display fixture 102 so that all input blocks 111-122 appear as icons for and are associated with that same application.

Figure 13:
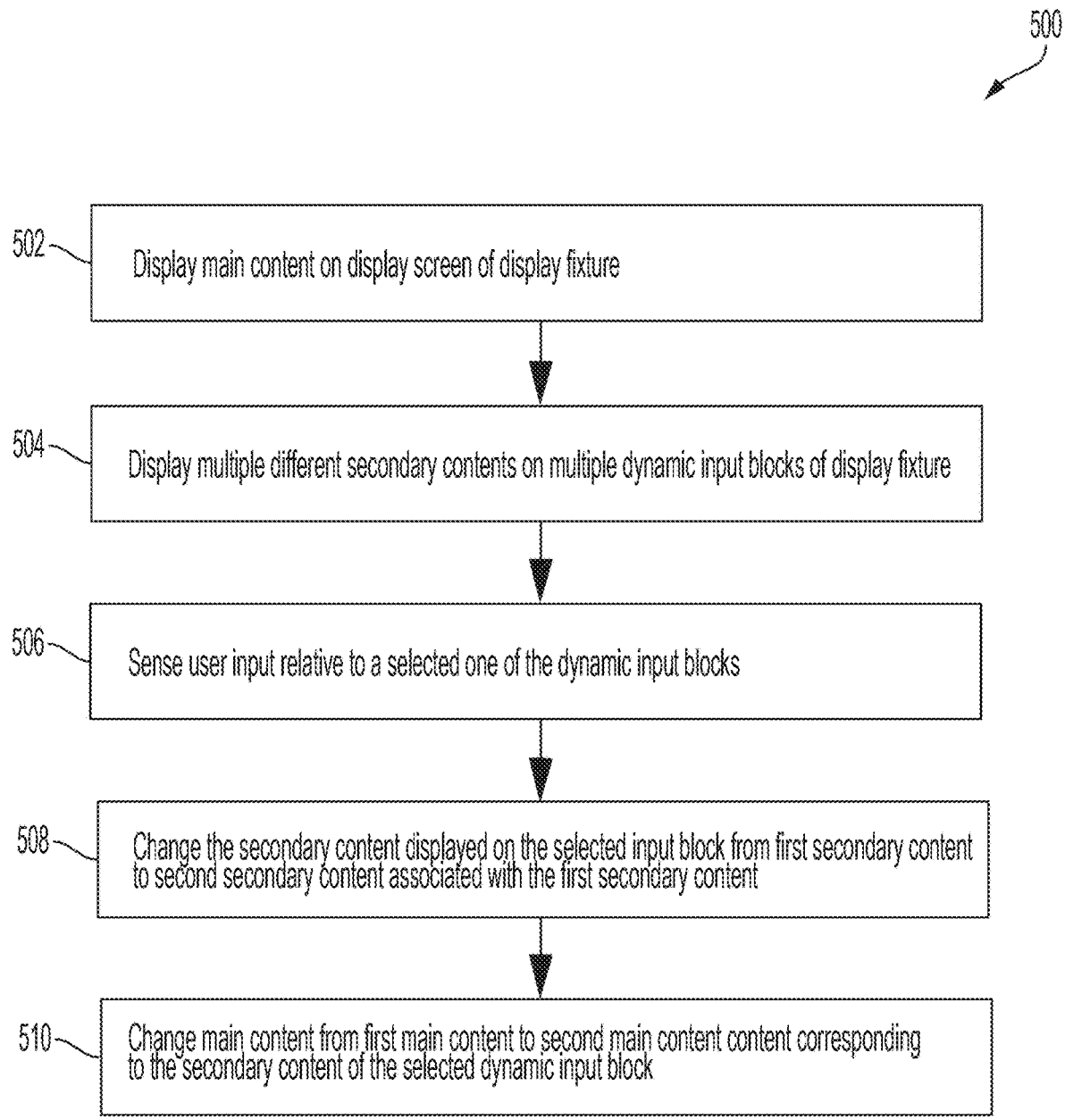
FIG. 13 shows a flow diagram of an example user interaction with a product showcase system.

FIGS. 4-7 show user interaction with product showcase system 100. FIG. 13 shows a flow diagram 500 of an example user interaction with product showcase system 100. Although these examples showcase digital games as an example, display fixture 102 is not so limited and can include similar configurations for other products.

For example, a dynamic input block (e.g., one of dynamic input blocks 111-122) may display a first content when it is in its nominal state and may display a second content when the customer interacts with display fixture 102. For example, in a gaming implementation, the first content may be an icon, glyph or character associated with a game while the second content may be a video that showcases aspects of the game being played. Thus, when initiated, the change from the first content to the second content promotes better understanding of the gaming application, which in turn helps draw the customer into the display fixture to learn more about the game.

Figure 4:
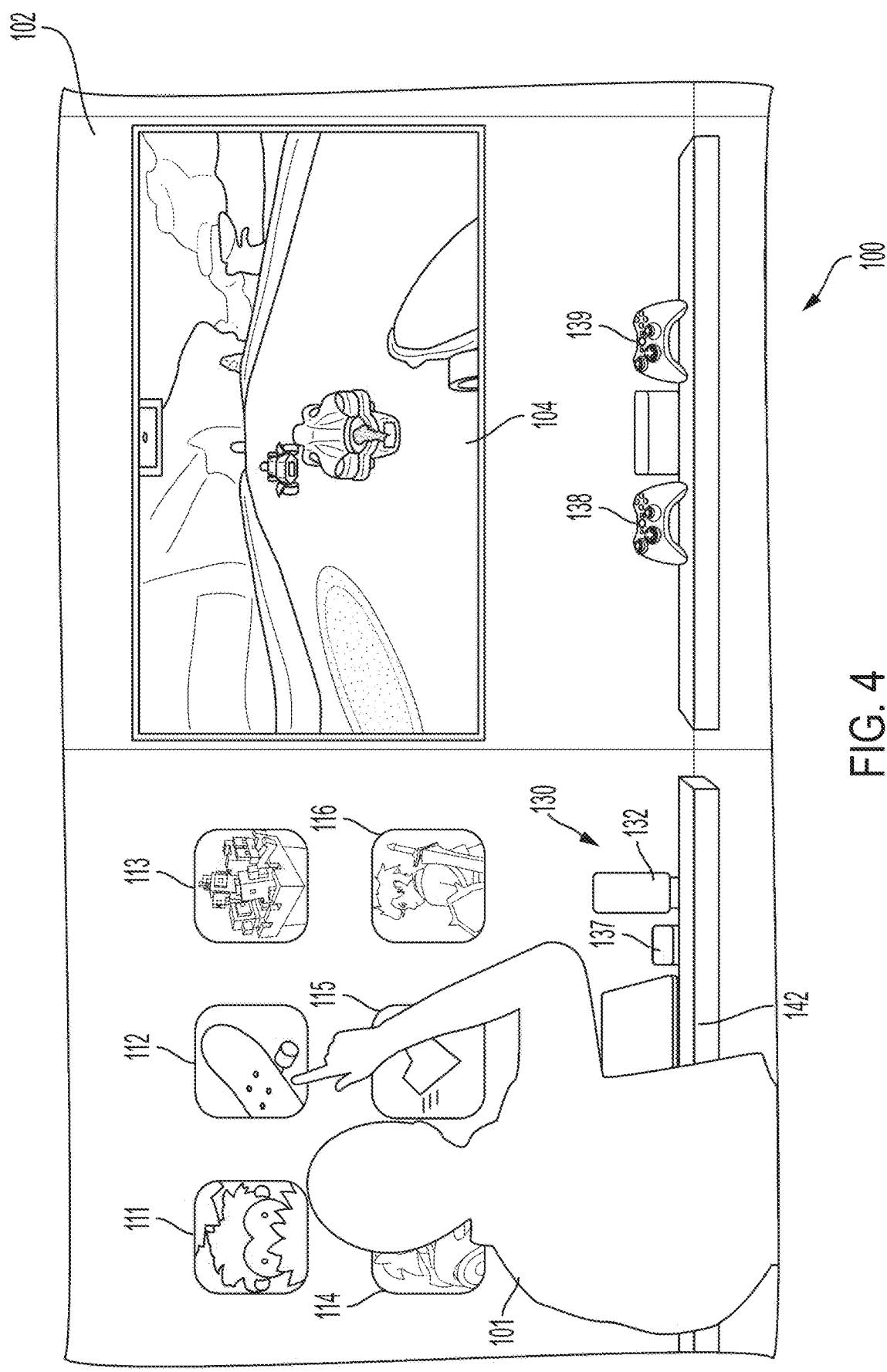
FIG. 4 shows a user interacting with an input block of the product showcase system.

More specifically, FIG. 4 shows a partial view of display fixture 102 with user 101 interacting with input block 112. Display fixture 102 initially displays main content on display screen 104 of display fixture 102 (step 502). Display fixture 102 also initially displays multiple different secondary contents on multiple dynamic input blocks 111-122 of display fixture 102 (step 504). Display fixture 102 may come to the attention of users (e.g., user 101) from afar by viewing the main content on display screen 104 or the secondary content on any of dynamic input blocks 111-122. In the illustrated example, display screen 104 in a first configuration displays first main content associated with the racing game of input block 114, which displays secondary content associated with the racing game displayed on display screen 104. Additionally or alternatively, display screen 104 in the first configuration may display an icon or similar image/animation that represents a gaming subscription service that includes the games displayed on dynamic input blocks 111-122.

In embodiments, input block 114 displaying the racing game showcased on display screen 104 may be lit up or otherwise distinguished from the other input blocks 111-122 to help direct the user to further investigate the showcased product.

Once at display fixture 102, a user may interact with any of dynamic input blocks 111-122. In the example shown in FIG. 4, user 101 elected to interact with input block 112 displaying content associated with a skateboard game, i.e., content from a game that is different from the game showcased on display screen 104 in the first configuration. In this example, user 101 interacted with input block 112 by touching it. Display fixture 102 senses the user input relative to selected dynamic input block 112 to determine that dynamic input block 112 was selected by or is otherwise of interest to the user (step 506).

FIG. 4 shows input block 112 displaying first secondary content associated with the skateboard game. The first secondary content may include a gentle animation. The animation may correspond to a large-scale version of the product icon associated with the game and the dynamic input block may have a square shape with rounded corners similar to the application icon. In this way, input block 112 may be a large-scale physical manifestation of a comparatively small-scale digital mobile application icon associated with the digital product to bring the digital product to life and/or to give the user the impression of being shrunk down into the digital world. For example, input block 112 may be the size of a user's hand, where an icon on their smartphone might be only a size of their fingertip. In some examples, to achieve this effect, input block 112 may be at least 4 inches tall and at least 4 inches wide.

Each of input blocks 111-122 may include similar first secondary content associated with the products (e.g., games) respectively showcased on each of input blocks 111-122. The first secondary content may be the default content showcased on input blocks 111-122 in the absence of user input, or after a period of time without user input.

Figure 5:
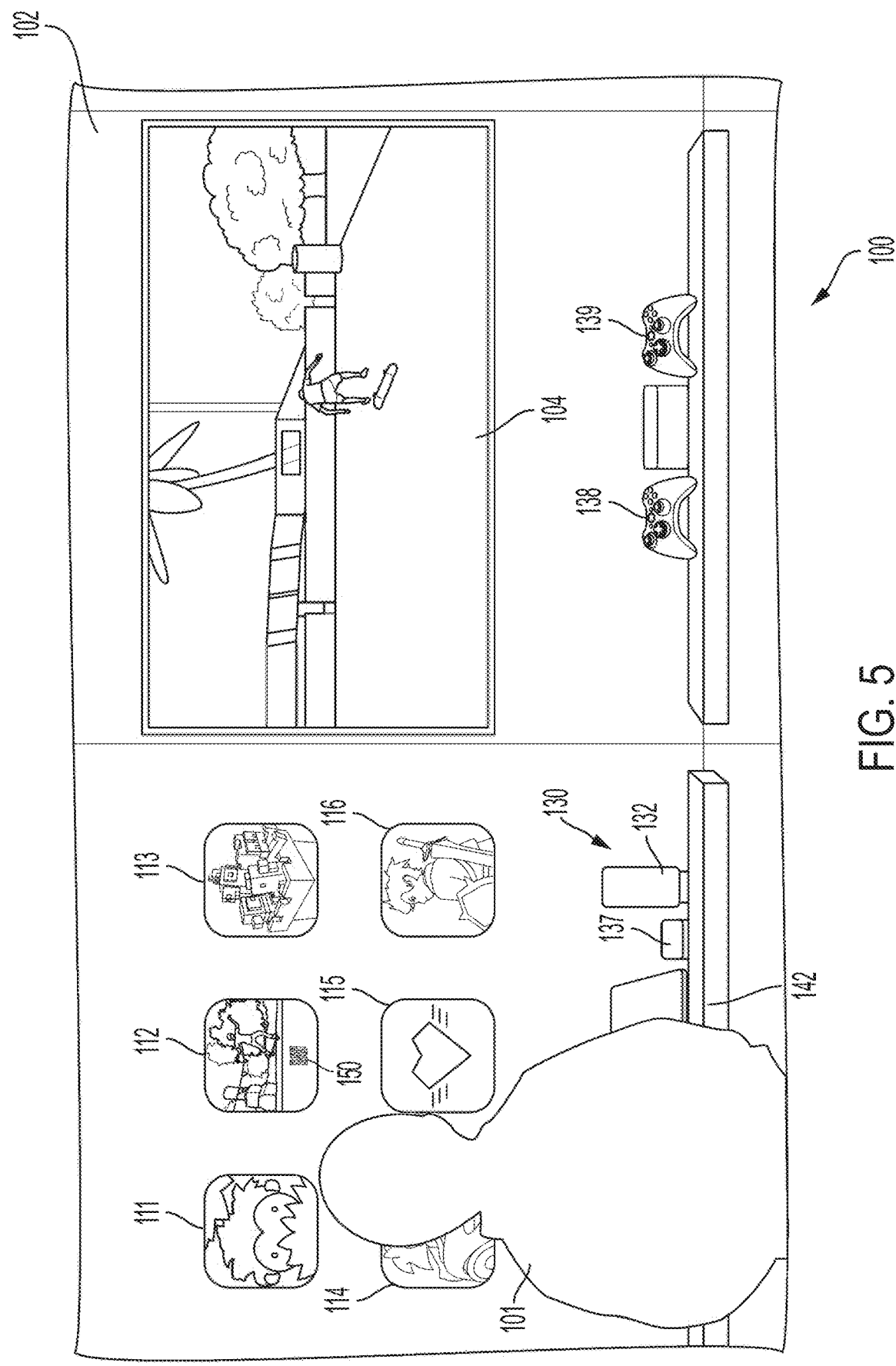
FIG. 5 shows the product showcase system in response to the user interaction.

FIG. 5 shows display fixture 102 of FIG. 4 after user 101 interacted with (i.e., touched) input block 112 displaying content associated with the skateboard game. As a result of and in response to the user interaction, display fixture 102 changes the first secondary content displayed on input block 112 to second secondary content associated with the skateboard game (step 508). The second secondary content may be, for example, a video or demo of the skateboard game. Although FIG. 5 shows the result of user interaction with input block 112, user interaction with any other of input blocks 111-122 may produce a similar result, i.e., may showcase a second secondary content associated with the product of the interacted with input block.

As shown in FIG. 5, in response to user interaction with input block 112, display fixture 102 changes the main content displayed on display screen 104 from the first main content to second main content, the second main content corresponding to the secondary content of input block 112, the skateboard game (step 510). The content may include, for example, an alternate video of the game or a playable version of the game (e.g., a demo).

In embodiments, in response to user interaction with input block 112 one or more supplemental devices 130 may be activated to allow the user to interact directly with the game showcased on input block 112. For example, one of the smartphones 131-134 or tablets 135, 136 may automatically load the game showcased on input block 112 in response to user interaction with input block 112. Additionally or alternatively, a version of the game showcased on input block 112 may automatically load on display screen 104 and user 101 may play the game on display screen 104 using controllers 138, 139 or a user's user device 140 (e.g., a smartphone, tablet, etc.).

In embodiments, in response to the user interaction with input block 112 the game showcased on input block 112 may automatically be sent to user device 140 either from an external server or directly from product showcase system 100 (e.g., using NFC based technology).

The second secondary content displayed on input block 112 in response to user interaction with input block 112 may include a call to action, such as a QR code 150. The call to action may invite the user to learn more about the game, purchase the game, download the game, and/or sign up for a subscription service that provides access to the game and other features. The call to action may be overlaid on top of a video of the digital content that differs from the gentle animation. The user may respond to the call to action using user device 140. For example, the call to action may direct user device 140 to an external server to provide access to the game on the user device 140. Providing access on the user device 140 can include inviting the user to learn more about the game via user device 140, directing user device 140 to a location game can be purchased and/or downloaded, and/or directing user device 140 to location where user may sign up for a subscription service to provide access to the game.

In embodiments, the second secondary content may be different from the first secondary content. For example, the first secondary content may be an animation that is relatively passive to evoke a contemplative moment for the user. The second secondary content may be comparatively more active and/or interactive for the user than the first content. For example, the second secondary content may include a video and the QR code 150.

Figure 6:
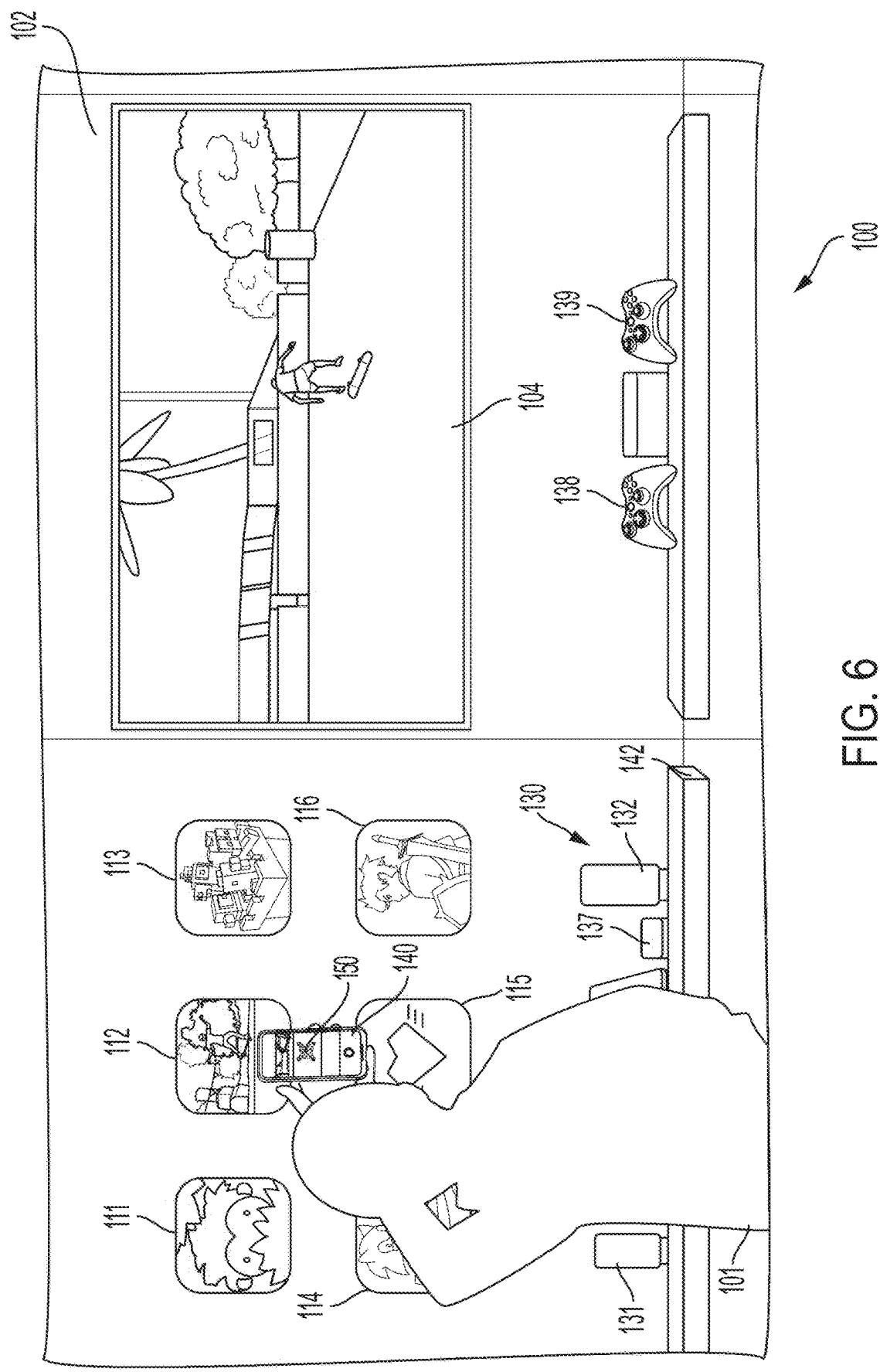
FIG. 6 shows further user interaction with the dynamic input block of the product showcase system.

As shown in FIG. 6 user 101 may employ user device 140 to scan the QR code 150, which may link the user, e.g., directly to a location where the user may download the game and/or to a location where the user may learn more about the game.

In embodiments, the user experience when a user responds to the call to action may be bifurcated depending upon the particular user. For example, display fixture 102 may showcase games included as a part of a subscription service and the call to action may direct the user differently depending upon whether or not the user is a subscriber to the subscription service. If the user is a subscriber to the subscription service, the call to action may automatically download the game on to user device 140. If the user is not a subscriber to the subscription service, the call to action may invite the user to subscribe or purchase the game a la carte.

In embodiments, the call to action from the dynamic input blocks 111-122 may be dynamically updatable either automatically or manually. For example, the displayed call to action itself may be changed either automatically and/or as manually defined (e.g., by the retailer). Additionally or alternatively, in examples in which the call to action links a user to another location (e.g., to download the game or learn more about the game) the location the user is sent to may be changed to reflect updates to the game or to provide the game in a language relevant to the user.

Figure 7:
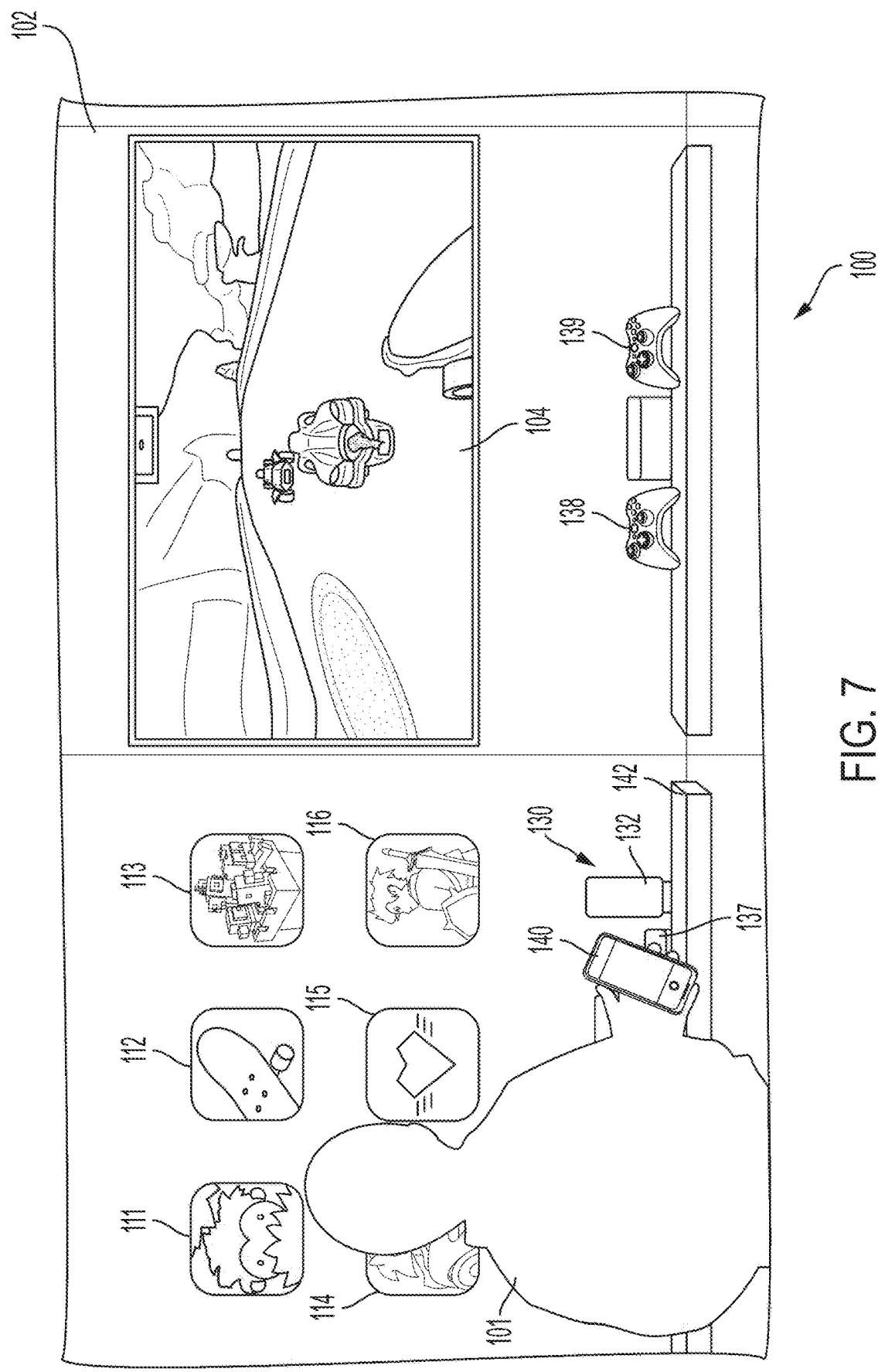
FIG. 7 shows user interaction with a supplemental device of the product showcase system.

As shown in FIG. 7, user 101 may communicate with product showcase system 100 by establishing an interface between their user device 140 and node 137. The interface between user device 140 and node 137 may allow the user to quickly and securely communicate with the product showcase system 100. The interface between user device 140 and node 137 may be established using an NFC-based technology or other similar technology.

In embodiments, the interface established via the user device 140 and node 137 may allow product showcase system 100 to create an experience personalized to the user. For example, the games displayed on display screen 104 and/or input blocks 111-122 may be selected using an algorithm that takes into account user preference (e.g., purchase history, likes, or any other user data indicative of user preferences). For example, if the customer likes card games then product showcase system 100 may display card games on one or more of dynamic input blocks 111-122 and/or display screen 104.

In embodiments, the interface established via the user device 140 and node 137 may allow a user to take over product showcase system 100. A user may take over product showcase system 100 to play a game, video, music, or other product. The ability to take over product showcase system 100 may be limited to certain users, for example, users that have subscribed to a subscription service sold by the retailer.

As discussed above, although the product showcase system 100 and flow diagram 500 have been described in detail in reference to a gaming application, the present disclosure is not limited to gaming applications and may be employed to promote any of the products discussed herein. For example, in embodiments product showcase system 100 may showcase content associated with music applications such as albums, songs, music-related subscription services, etc. Using a music subscription service as an example, dynamic input blocks 111-122 may display secondary content associated with a number of different albums included in the music subscription service. Display screen 104 in a first configuration may display first main content associated with one album that is included in the music subscription service and that is associated with one dynamic input block (step 502). The initially associated dynamic input block may display secondary content associated with the album displayed on display screen 104 (step 504), such as for example an image of the album. Additionally or alternatively, display screen 104 in the first configuration may display an icon or similar image/animation that represents the available music subscription service. Display fixture 102 may sense a user input relative to a different dynamic input block associated with a different album included in the music subscription service that is selected by the user to determine that the dynamic input block was selected by or is otherwise of interest to the user (step 506). In response to the user interaction, display fixture 102 may change the first secondary content displayed on the selected input block to second secondary content associated with the album of interest, such as for example a music video associated with that album (step 508). Further, in response to user interaction with the selected input block, display fixture 102 may change the main content displayed on display screen 104 from the first main content to second main content. The second main content may correspond to the secondary content of the selected input block (step 510), such as for example a concert video of the artist performing the album associated with the selected dynamic input block.

In other embodiments product showcase system 100 may showcase content associated with television applications such as movies, television shows, documentaries, video subscription services, etc. Using a video subscription service as an example, dynamic input blocks 111-122 may display secondary content associated with a number of different television shows or movies included in the video subscription service. Display screen 104 in a first configuration may display first main content associated with one television show or movie that is included in the video subscription service and that is associated with one dynamic input block (step 502). The initially associated dynamic input block may display secondary content associated with the television show or movie displayed on display screen 104 (step 504), such as for example a promotional image for the television show or movie. Additionally or alternatively, display screen 104 in the first configuration may display an icon or similar image/animation that represents the available video subscription service. Display fixture 102 may sense a user input relative to a different dynamic input block associated with a different television show or movie included in the video subscription service that is selected by the user to determine that the dynamic input block was selected by or is otherwise of interest to the user (step 506). In response to the user interaction, display fixture 102 may change the first secondary content displayed on the selected input block to second secondary content associated with the television show or movie of interest, such as for example a preview of the television show or movie (step 508). Further, in response to user interaction with the selected input block, display fixture 102 may change the main content displayed on display screen 104 from the first main content to second main content. The second main content may correspond to the secondary content of the selected input block (step 510), for example the second main content may be a full version of the television show or movie associated with the selected dynamic input block.

In other embodiments product showcase system 100 may showcase content associated with fitness applications such as workouts, exercise videos, tutorials, fitness subscription services, etc. Using a fitness subscription service as an example, dynamic input blocks 111-122 may display secondary content associated with a number of different workouts included in the fitness subscription service. Display screen 104 in a first configuration may display first main content associated with one workout that is included in the fitness subscription service and that is associated with one dynamic input block (step 502). The initially associated dynamic input block may display secondary content associated with the workout displayed on display screen 104 (step 504), such as for example an image of an individual engaged in the workout. Additionally or alternatively, display screen 104 in the first configuration may display an icon or similar image/animation that represents the available fitness subscription service. Display fixture 102 may sense a user input relative to a different dynamic input block associated with a different workout included in the fitness subscription service that is selected by the user to determine that the dynamic input block was selected by or is otherwise of interest to the user (step 506). In response to the user interaction, display fixture 102 may change the first secondary content displayed on the selected input block to second secondary content associated with the workout of interest, such as for example a video of an individual engaged in the workout (step 508). Further, in response to user interaction with the selected input block, display fixture 102 may change the main content displayed on display screen 104 from the first main content to second main content. The second main content may correspond to the secondary content of the selected input block (step 510), for example the second main content may be a video of a workout class engaging in the workout of interest associated with the selected dynamic input block.

In other embodiments product showcase system 100 may showcase content associated with an app store. For example, example, dynamic input blocks 111-122 may display secondary content associated with a number of different apps available on the app store. Display screen 104 in a first configuration may display first main content associated with one app that is available on the app store and that is associated with one dynamic input block (step 502). The initially associated dynamic input block may display secondary content associated with the app on display screen 104 (step 504), such as for example an icon of the app. Additionally or alternatively, display screen 104 in the first configuration may display an icon or similar image/animation that represents the app store itself. Display fixture 102 may sense a user input relative to a different dynamic input block associated with a different app available on the app store that is selected by the user to determine that the dynamic input block was selected by or is otherwise of interest to the user (step 506). In response to the user interaction, display fixture 102 may change the first secondary content displayed on the selected input block to second secondary content associated with the app of interest, such as for example a tutorial of the app (step 508). Further, in response to user interaction with the selected input block, display fixture 102 may change the main content displayed on display screen 104 from the first main content to second main content. The second main content may correspond to the secondary content of the selected input block (step 510), for example the second main content may be a promotional video of the app of interest associated with the selected dynamic input block.

In other embodiments product showcase system 100 may showcase content associated with physical products such as smartphones, watches, computers, televisions, etc. Using a smartphone as an example, dynamic input blocks 111-122 may display secondary content associated with a number of different apps available for the smartphone. Display screen 104 in a first configuration may display first main content associated with one app that is associated with one dynamic input block (step 502). The initially associated dynamic input block may display secondary content associated with the app displayed on display screen 104 (step 504), such as for example an icon of the app. Additionally or alternatively, display screen 104 in the first configuration may display images, videos, etc. of the smartphone itself. Display fixture 102 may sense a user input relative to a different dynamic input block associated with a different app that is selected by the user to determine that the dynamic input block was selected by or is otherwise of interest to the user (step 506). In response to the user interaction, display fixture 102 may change the first secondary content displayed on the selected input block to second secondary content associated with the app of interest, such as for example a video of the app in use (step 508). Further, in response to user interaction with the selected input block, display fixture 102 may change the main content displayed on display screen 104 from the first main content to second main content. The second main content may correspond to the secondary content of the selected input block (step 510), for example the second main content may be a promotional video showing the capabilities of the app associated with the selected dynamic input block. Additionally or alternatively, the second main content may be independent from the selected input block and may instead by a tutorial about the smartphone.

Figure 8:
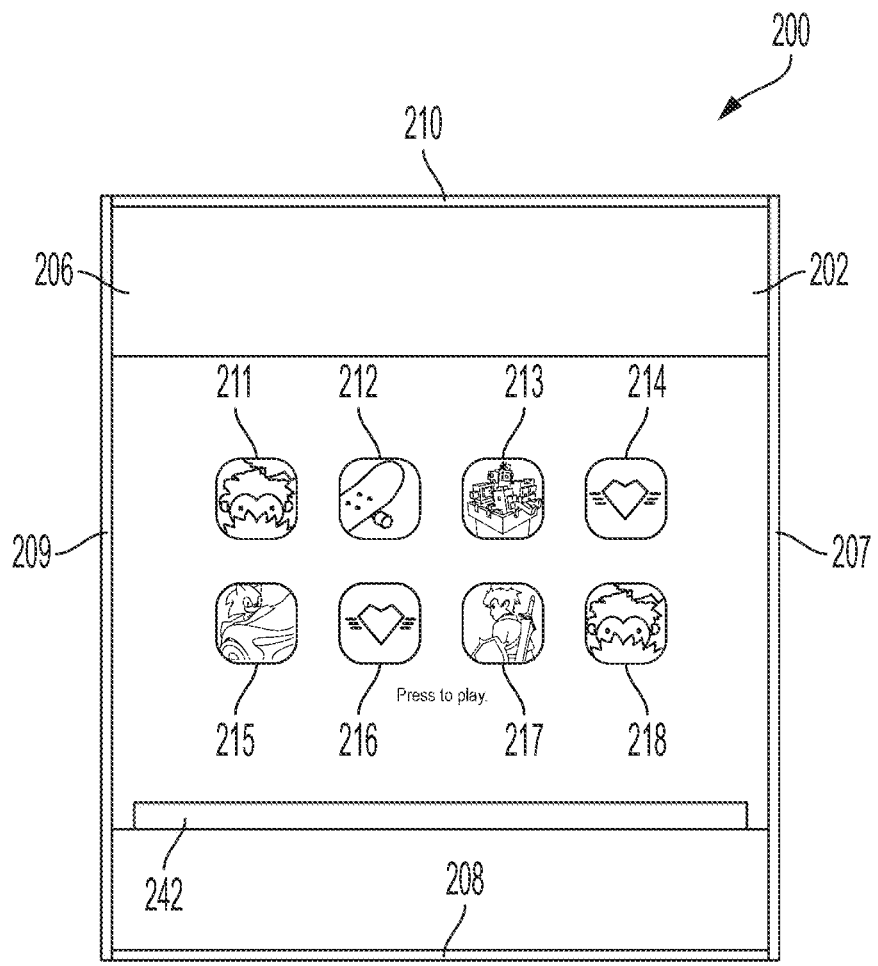
FIG. 8 shows a front view of another an example product showcase system.

FIG. 8 shows another example product showcase system 200. Showcase system 200 may include a display fixture 202 having dynamic input blocks 211-218 arranged along a surface 206. Product showcase system 200 may be provided without a display screen. Though not shown, product showcase system 200 may include aspects of any of the product showcase systems discussed above, including for example supplemental devices.

In embodiments, display fixture 202 may be a bay and surface 206 may be a rear wall of the bay. Surface 206 may be surrounded by four walls 207-210 projecting outwardly. Display fixture 202 may include a counter 242 having one or more shelf.

Figure 9:
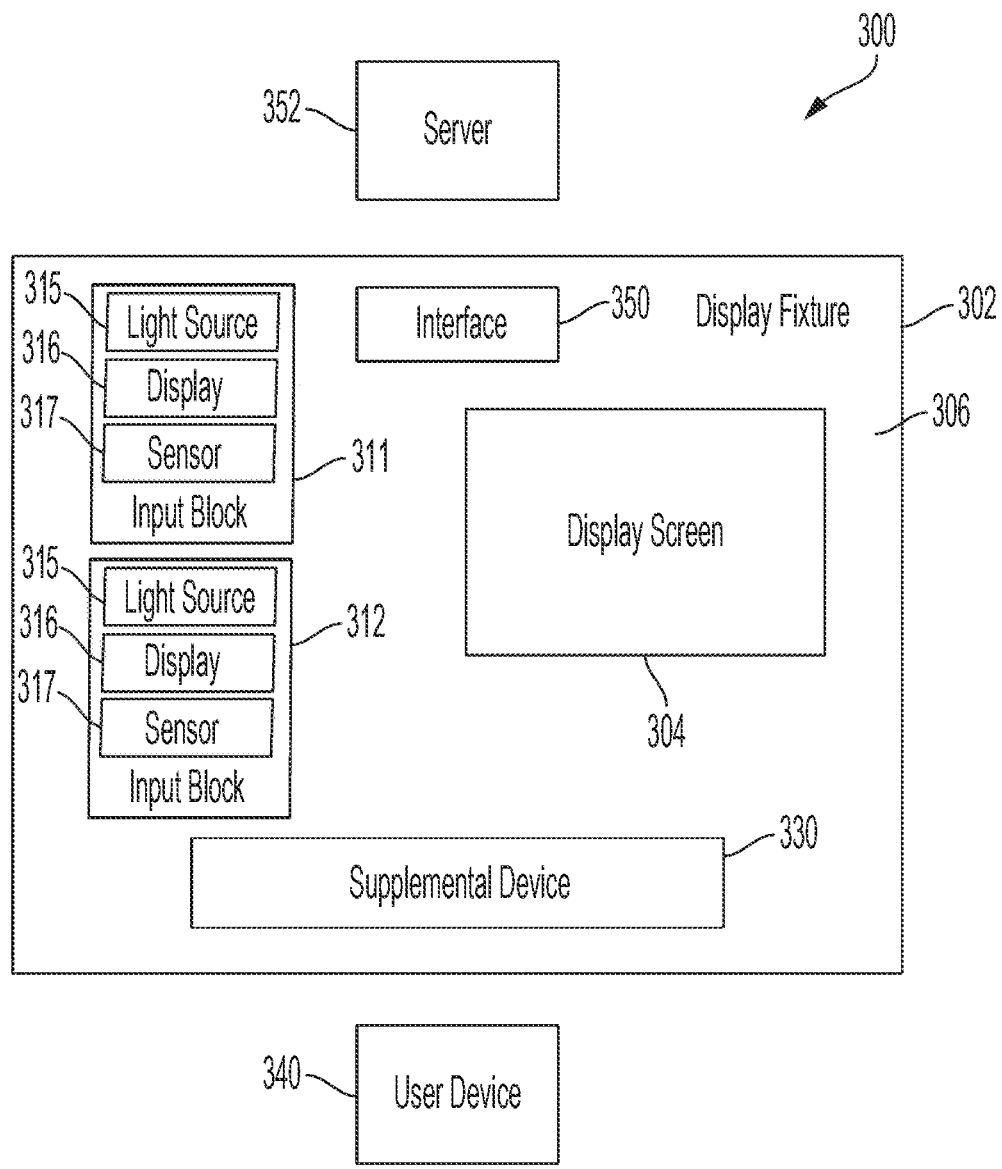
FIG. 9 shows a schematic view of another example product showcase system.

FIG. 9 shows a schematic view of an example product showcase system 300. Product showcase system 300 may include any of the features and/or functions of the above described product showcase systems and vice versa.

For example, product showcase system 300 may include a display fixture 302 that blurs the line between physical and digital products to bring the digital products to life. Display fixture 302 may include a display screen 304 and one or more dynamic input blocks 311, 312. Dynamic input blocks 311, 312 may have the characteristics of any other input blocks described herein, and may be included within display fixture 302 in any number, subject to the space available within display fixture 302.

Display fixture 302 may include supplemental device 330. Display fixture 302 may utilize one or more of display screen 304, input blocks 311, 312, and supplemental device 330 to showcase, automatically or as manually-defined, content (e.g., any of images, animations, or videos) from products in a manner that both engages users and encourages users to directly interact with products displayed. In so doing, display fixture 302 provides users with an understanding of the breadth of the showcased products and allows them to experience the products for themselves.

Product showcase system 300 may communicate with an external server 352 and/or with user device 340. As a result, product showcase system 300 (e.g., display screen 304, dynamic input blocks 311, 312, supplemental device 330) may serve as an intermediary that directs users to products (e.g., for purchase) or other information stored on the external server 352. Communication with external server 352 may allow features (e.g., the call to action) of product showcase system 300 to be dynamically updatable by a retailer, other third party, or automatically.

In embodiments, display fixture 302 may be a bay. The bay may include a rear wall (e.g., a display surface 306) along which one or more of display screen 304, input blocks 311, 312, and supplemental device 330 may be arranged. The bay may further include side walls projecting out from the rear wall. The supplemental devices may be arranged along one or more of the side walls.

In embodiments, display fixture 302 may be a table having a top (e.g., display surface 306) along which one or more of display screen 304, input blocks 311, 312, and supplemental device 330 may be arranged.

In embodiments, display fixture 302 may be a window along which one or more of display screen 304, input blocks 311, 312, and supplemental device 330 may be arranged.

Display screen 304 may showcase content from one or more products to showcase the products from afar and to engage users with display fixture 302, in the same manner as described above for display fixtures 102 and 202.

In embodiments, display screen 304 may be connected to input blocks 311, 312 and/or supplemental device 330 and may display content in response to user interaction with input blocks 311, 312 and/or supplemental device 330 in any of the ways described above. For example, any of input blocks 311, 312 and/or supplemental device 330 may be associated with a product and upon user interaction with input blocks 311, 312 and/or supplemental device 330 display screen may display content associated with the product of the interacted with device.

In embodiments, display screen 304 may operate independently from input blocks 311, 312 and/or supplemental device 330. For example, display screen 304 may rotate between displaying digital content (e.g., videos) associated with a number of different products independent from user interaction with input blocks 311, 312 and/or supplemental device 330.

In embodiments, display screen 304 may allow for controller-based demonstrations of a digital product, such as a game. For example, a video of a game may run on display screen 304, which may in turn attract the user to display screen 304. Supplemental device 330 may be a controller, e.g., a video game controller. The user may interact with display screen 304, e.g., by playing the game from the video using the controller (i.e., supplemental device 330) or user device 340.

In embodiments, display fixture 302 may include light effects for the controller. In a gaming application, a user may select one of dynamic input blocks 311, 312 and the selected dynamic input block may be highlighted by light source 315. The game featured on the selected one of dynamic input blocks 311, 312 may run on display screen 304 and/or on the selected one of dynamic input blocks 311, 312. The controller may be highlighted by a separate light effect for the controller and a user may use the controller to play the game run on display screen 304 and/or on the selected one of dynamic input blocks 311, 312.

In embodiments, display screen 304 may display content that a user may interact with. Any of input blocks 311, 312, supplemental device 330, user device 340, etc. may be used as controllers to control content (such as a game) displayed on display screen 304. For example, display screen 304 may run a game and user may control a character or feature of the game using any of input blocks 311, 312, supplemental device 330 (such as a controller), user device 340, etc.

Input blocks 311, 312 may include dynamic displays 316 that display content associated with the product and that include an interface that allows user interaction with the product. For example, when the product is a digital game input blocks 311, 312 may display on the display 316 demos of the game and/or images/animations indicative of an application icon associated with the game on the home page of a smartphone or other device. Although two input blocks 311, 312 are shown in FIG. 9, showcase system 300 may include any number of input blocks.

In embodiments, each of input blocks 311, 312 may be associated with (e.g., display content related to) a product that is unique relative to products associated with all other input blocks of display fixture 302 thereby maximizing the number of products showcased.

In embodiments, two or more (e.g., all) input blocks 311, 312 may be associated with the same product so that, for example, display fixture 302 can feature that product and/or so that multiple users may interact with the same product simultaneously.

In embodiments, a first content may be displayed on input blocks 311, 312. The first content, may, for example, include an image or a gentle animation to pique the interest of a user, and to convey that it is interactable. The first content may be associated with an icon of a mobile application. For example, the first content may be a gentle animation or image that corresponds to an icon of a mobile application for the digital content to bring the digital mobile application to life. The first content may be a default for the dynamic input blocks 311, 312.

In embodiments, a second content may be displayed on input blocks 311, 312. The second content may, for example, include a video associated with the product. The second content may be different from the first content yet associated with the same product as the product associated with the first content.

In embodiments, the second content may include a call to action, such as a QR code or NFC-based signal, that may interact with the user device 340 to promote further user interaction. For example, the call to action may allow the user to learn more about the product, download the digital product, and/or invite them to sign up for a subscription service that provides access to the game and other features. In embodiments, the call to action may be overlaid on top of a video.

In embodiments, input blocks 311, 312 may each include a sensor 317 such as for example a pressure sensor, a proximity sensor, a camera, a motion sensor, a receiver, etc. The content displayed on input blocks 311, 312 may, upon user interaction (e.g., by touching the screen) received or detected by sensor 317, be changed. For example, the first content may be changed to the second content, or vice versa.

In embodiments, input blocks 311, 312 may produce a visual or an audial response when activated by a user. For example, input blocks 311, 312 may include a light source 315, which can cause input blocks 311, 312 to emit light (e.g., from an LED) when touched by a user. Also for example, input blocks 311, 312 may glow or emit light from side edges of input blocks 311, 312. Also for example, input blocks 311, 312 may include or be able to communicate with an audio output (e.g., a speaker) that emits a sound when activated by a user. Also for example, input blocks 311, 312 may include haptic feedback mechanisms such that input blocks 311, 312 may provide haptic feedback to a user upon the user touching input block 311, 312. For example the haptic feedback may feel like a click or a button-press.

In embodiments, input blocks 311, 312 may be control surfaces for games.

In embodiments, input blocks 311, 312 may each be associated with a different digital game. Each of input blocks 311, 312 may display dynamic content associated with its associated digital game. Upon a user selection of one the dynamic input blocks 311, 312, the content of the selected dynamic input block may change to second content associated with its associated digital game, and display screen 304 may display third content associated with the associated digital game. At least one of input blocks 311, 312 and supplemental device 330 may be used to control at least a portion of the third content.

In embodiments, the third content displayed on display screen 304 may be the associated digital game. At least one of input blocks 311, 312 and supplemental device 330 may provide input for playing the associated digital game displayed on display screen 304.

In embodiments, multiple (e.g., all) dynamic input blocks of a display fixture may display coordinated, but different, content. A display screen of a display fixture may also display coordinated content with multiple dynamic input blocks of the display fixture. For example, different dynamic input blocks may display different content associated with something being displayed on the display screen. For instance, the dynamic input blocks may each display a character for selection to use in a video game displayed on the display screen. Also for instance, the dynamic input blocks may display options for answering a quiz question or survey displayed on the display screen. User selection of the dynamic input blocks in these scenarios can act as control inputs to influence progression or other change in the content displayed on the display screen.

In embodiments, supplemental device 330 is a video game controller. Upon the user selection of the selected input block 311, 312 the digital game associated with the selected input block 311, 312 is automatically run on display screen 304 and the controller provides user control of the digital game run on display screen 304.

In embodiments, upon user selection of a selected input block 311, 312 the digital game associated with the selected input block 311, 312 may be automatically run on display screen 304. Content displayed on more than one of input block 311, 312 may change to content associated with the associated digital game, and the more than input block 311, 312 provides user control of the digital game run on display screen 304.

Any of the content showcased on display fixture 302 may be dynamically updatable. Dynamically updatable may mean, for example, that a website that the user is sent to (e.g., upon activating a call to action such as a QR code on an input block) can be updated or the location that the user is sent to can be changed. Dynamically updatable may also mean remotely updatable (e.g., by the retailer).

Display fixture 302 may include one or more interfaces 350 that facilitate user interaction with elements of display fixture 302, including any of display screen 304, input blocks 311, 312, and/or supplemental device 330. User interaction may include any of the user interaction described herein.

In embodiments, interface 350 may be incorporated into surfaces of display fixture 302, display screen 304, input blocks 311, 312, supplemental device 330, etc.

In embodiments, interface 350 may be a pressure sensor that is configured to detect and react to pressure exerted by the user. In one example, pressure sensor may be incorporated into one or more of input blocks 311, 312. The pressure sensor may detect pressure exerted by a user who touches input block 311 or 312. The pressure sensor may detect and distinguish between pressure exerted by a user at different locations. In response, product display system 300 may cause content displayed on display screen 304 or on the touched input block 311, 312 to change (e.g., from the first to the second content).

In embodiments, interface 350 may be a proximity sensor. The proximity sensor may respond to a user being proximate to one of input blocks 311, 312. For example, such sensed proximity may cause content displayed on display screen 304 or on the dynamic input block 311, 312 to which the user is most proximate to change (e.g., from the first to the second content).

In embodiments, interface 350 may be a motion sensor. The motion sensor may respond to a gesture of the user. The gesture may, for example, be a hand motion. For example, user may point or wave their hand at one of input blocks 311, 312, which may cause content displayed on display screen 304 or on the gestured-at input block 311, 312 to change (e.g., from the first to the second content).

In embodiments, interface 350 may be a camera. The camera may track eye movements to allow for interaction with display fixture 302 based upon a user's gaze. For example, camera may detect that a user is staring at input block 312 for a predetermined amount of time and, in response, product display system 300 may, e.g., light up input block 312 to encourage further user interaction, or may cause content displayed on display screen 304 or on the gazed-at input block 311, 312 to change (e.g., from the first to the second content).

In embodiments, interface 350 may include a NFC-based transmitter/receiver. This NFC-based technology may allow display fixture 302 to interact with user device 340. For example, the NFC-based interface 350 may allow the digital product to be sent directly from display fixture 302 to user device 340.

In embodiments, interface 350 may be a receiver that responds to a signal sent from a user device 340. In such configurations, user device 340 may function as a wand or remote to interface and/or control aspects of display fixture 302.

In embodiments, interface 350 may be or include any combination of the above-mentioned options for interface 350. For example, where interface 350 includes both a proximity and a touch sensor, a dynamic input block may display a first content as the user approaches and a second content when the user touches it.

Supplemental device 330 may be arranged in display fixture 302 to promote yet further user interaction with products. Supplemental device 330 may include alone or in combination smartphones, tablets, nodes, controllers, etc.

In embodiments, supplemental device 330 may include a node that may interact with user device 340. Node may allow user to take over display fixture 302 (e.g., to play a game).

In embodiments, supplemental device 330 may react (e.g., light up, make a sound, etc.) in response to user interaction with display fixture 302 to encourage the user to interact with supplemental device 330.

In embodiments, one or more of display screen 304, input blocks 311, 312, and supplemental device 330 may be connected such that content can run between multiple devices of display fixture 302. For example, dynamic input blocks 311, 312 and display screen 304 may display common content associated with a product. Common content may for example be a game in which the dynamic input blocks 311, 312 and/or display screen 304 are a part of the game itself, such as a memory game. Additionally or alternatively, common content may for example be a sequence that moves across dynamic input blocks 311, 312 and/or display screen 304 in a snake-like fashion. In a fitness application for example, common content could be videos of an individual engaged in a workout and the individual may move between dynamic input blocks 311, 312 and/or display screen 304 during the workout. Input block 311 may provide access for a first user to the common content and input block 312 may provide a second user to the common content. Display screen 304 may show views of users interacting with the common content on input blocks 311, 312. In such a configuration, the devices of display fixture 302 may together be used in a game. For example, each input block 311, 312 may provide different points of view for the same game (first person, third person, etc.) and display screen 304 may display one or more global views of the game, cycle between points of view (first person, third person, etc.) and/or show split screens of various input blocks 311, 312. Such applications may implemented in the e-sports environment, for example.

In embodiments, input blocks 311, 312 may display different content and display screen 304 may toggle between the content of the various input blocks 311, 312. For example, in a gaming application multiple users may play multiple different games running on different dynamic input blocks 311, 312 and display screen 304 may toggle between views of the different games being played.

Figure 10:
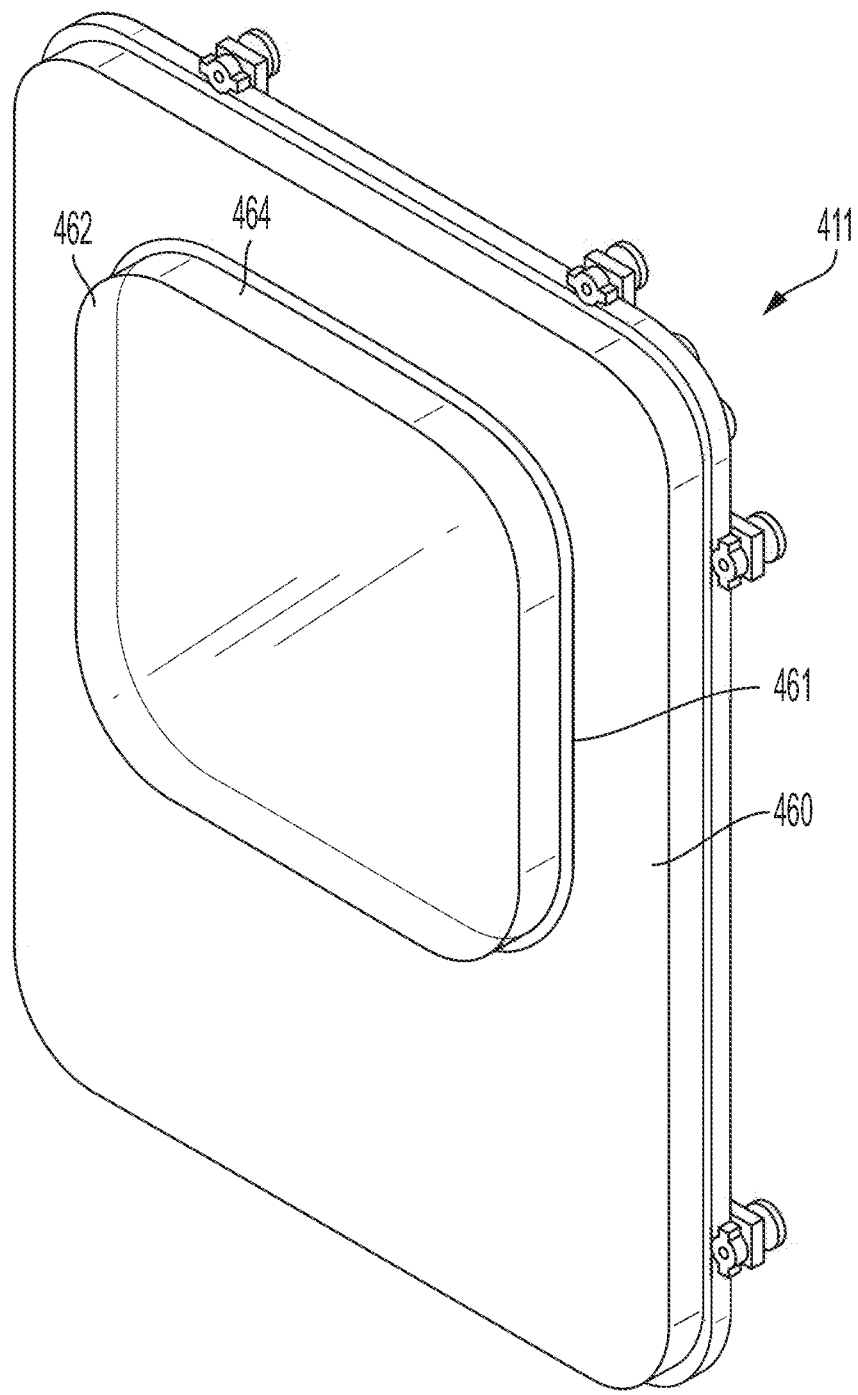
FIG. 10 shows an example isolated dynamic input block of a product showcase system.
Figure 11:
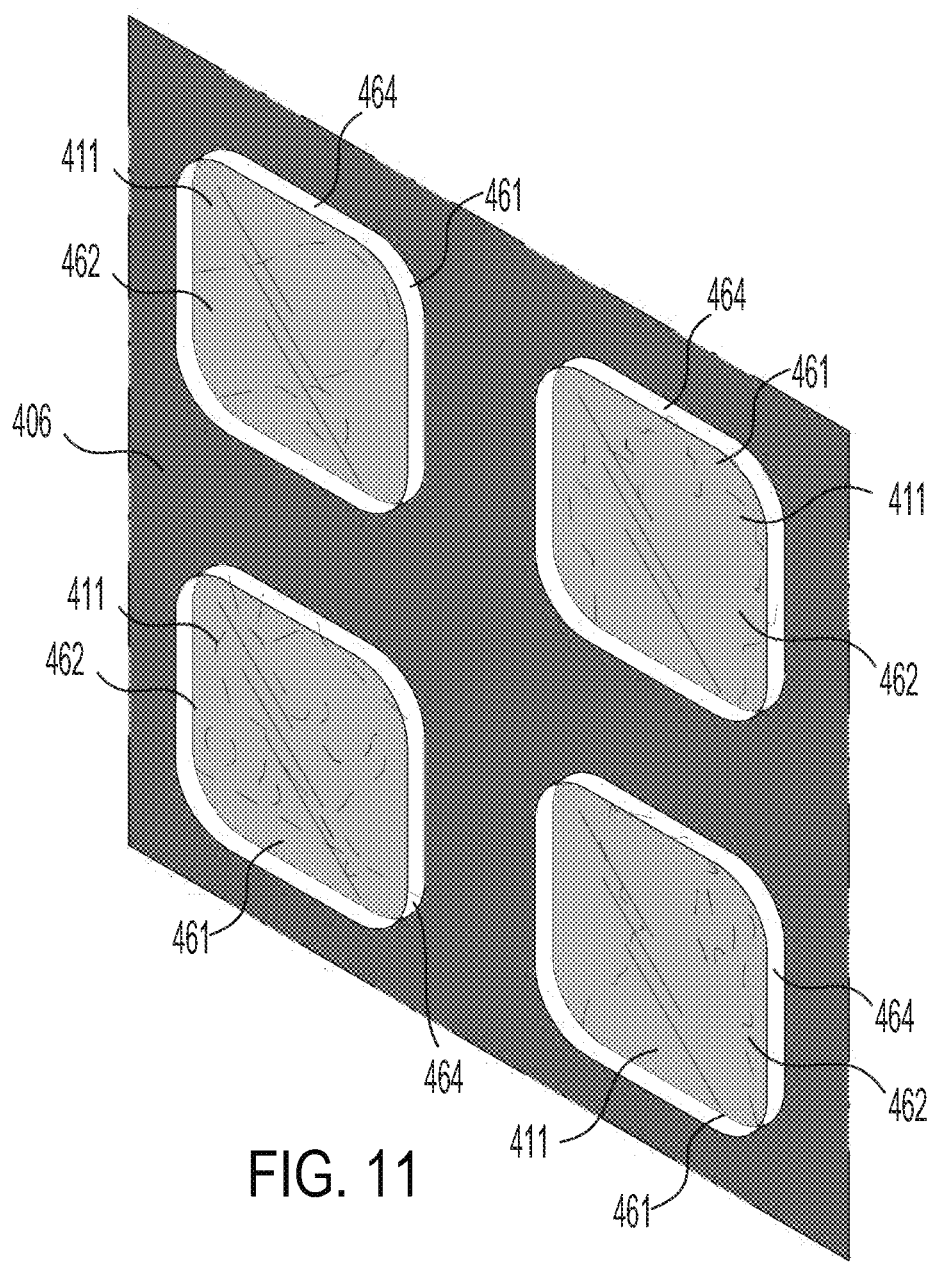
FIG. 11 shows an example visual effect of a product showcase system.

FIG. 10 shows a perspective view of an example input block 411 in accordance with aspects of the invention, which may be included in any of the product showcase systems described above (e.g., input block 411 may be any of the dynamic input blocks described above). Input block 411 may be a multiple piece construction that may include electronics 460 and lens 462. Electronics 460 may be or include a computer with a display screen 461 that a user may interact with, such as a tablet. Lens 462 may be provided over part or all of electronics 460. Lens 462 may be a translucent (e.g., transparent) structure of any shape and may have sufficient thickness to protrude through and out from a display surface disposed around lens 462 (e.g., display surface 406, see FIG. 11). Lens 462 may be made of, for example, glass, acrylic, plastic, or any other suitably-transmissive material. The electronics 460 and lens 462 together may give input block 411 3D properties (e.g., may together form an object, such as a button, with a specific thickness) while also providing an actionable display. The electronics 460 and lens 462 together may bring the dynamic input block 411 to life for the user, i.e., to trigger the user's curiosity and promote interaction with the dynamic input block 411.

Lens 462 and/or electronics 460 may include a touch sensor (e.g., a pressure sensor or other sensor such as a thermal sensor) that detects a user's touch. Lens 462 and/or electronics 460 may signal to attract a user to input block 411 and/or to enhance the impression that input block 411 is a real-life icon that is analogous to a digital icon. Input block 411 may protrude from the rear of a display surface of a display fixture (e.g., display surface 106) through the display surface such that lens 462, but and not electronics 460, are visible to a user (e.g., electronics 460 may be hidden behind a wall (e.g., display surface 106) of the product showcase system in which it is installed). For example, lens 462 may protrude out from the display surface of the display fixture, such that a perimeter face 464 of lens 462 is visible.

Perimeter face 464 may glow or otherwise emit light, helping to give input block 411 a defined and highlighted appearance. FIG. 11 shows an example representation of this visual effect, aspects of which may be included in any of the above described product showcase systems. In FIG. 11 display surface 406 of a display fixture is shown in a dark gray color, representing a static surface. Display screens 461 of electronics 460 of each dynamic input block 411 are shown in a light gray color with broken-line content, representing dynamic secondary content such as has been described previously. Perimeter faces 464 of lenses 462 of dynamic input blocks 411 are shown white, representing their illumination and/or emission of light. Bordering lenses 462 of input blocks 411 in this way, extending out from display surface 406, this light effect highlights each individual input block 411 and helps to define its character as a fun, three-dimensional dynamic button in an immersive user interaction. Input blocks 411 may be spaced apart from each other such that the light effect of each individual input block is distinct and does not interrupt the light effect of adjacent input blocks 411.

In some embodiments, input block 411 may include LEDs situated such that light emitted from the LEDs may shine through perimeter face 464 of lens 462 to attract a user. For example, such LEDs (or other light source) may be a part of electronics 460. Other signals, such as audio or haptic signals, may also be emitted from input block 411. For example, when a user indicates selection of or interest in a dynamic input block 411 (e.g., by touching a selected dynamic input block 411) dynamic input block 411 may emit a sound (or cause another element of its display fixture to emit a sound) or provide haptic feedback (e.g., vibration feeling like a click or a button-press) indicating its selection.

Figure 12:
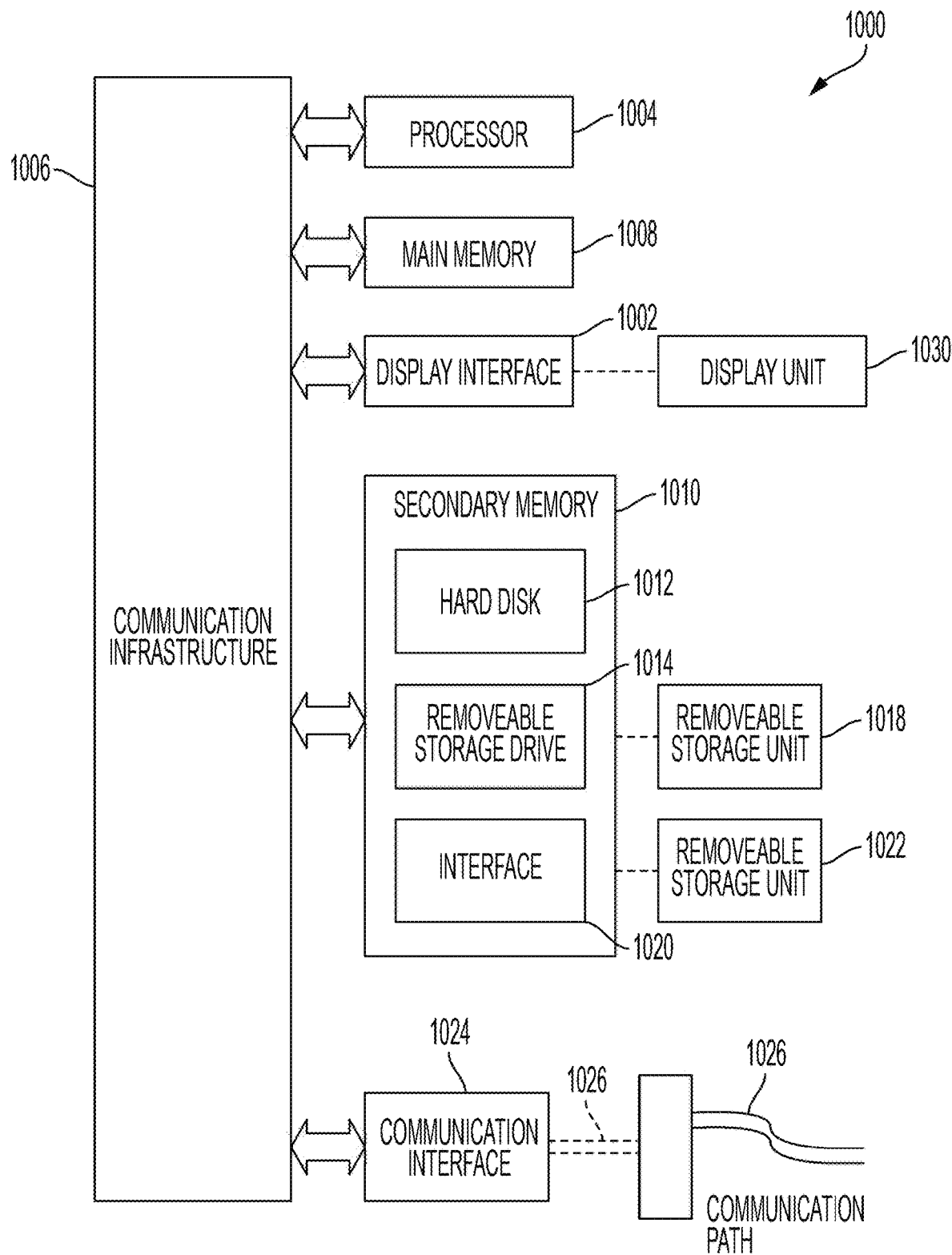
FIG. 12 shows a schematic view of an example computer of a product showcase system.

Features of the product showcase systems (e.g., display screens, input blocks, supplemental devices, etc.) discussed herein may each include one more aspects of a computer. FIG. 12 illustrates an example computer 1000, aspects of which can be incorporated into features (e.g., display screens, input blocks, supplemental devices, etc.) of the product showcase systems.

In embodiments, computer 1000 can be implemented as computer-readable code.

If programmable logic is used, such logic may execute on a commercially available processing platform or a special purpose device. One of ordinary skill in the art may appreciate that embodiments of the disclosed subject matter can be practiced with various computer configurations, including multi-core multiprocessor systems, minicomputers, and mainframe computers, computer linked or clustered with distributed functions, as well as pervasive or miniature computers that can be embedded into virtually any device.

For instance, at least one processor device and a memory can be used to implement the above described embodiments. A processor device can be a single processor, a plurality of processors, or combinations thereof. Processor devices may have one or more processor "cores."

Various embodiments of the inventions can be implemented in terms of this example computer 1000. After reading this description, it will become apparent to a person skilled in the relevant art how to implement one or more of the inventions using other computers or computer architectures. Although operations can be described as a sequential process, some of the operations may in fact be performed in parallel, concurrently, or in a distributed environment, and with program code stored locally or remotely for access by single or multi-processor machines. In addition, in some embodiments the order of operations can be rearranged without departing from the spirit of the disclosed subject matter.

Processor 1004 can be a special purpose or a general purpose processor device. As will be appreciated by persons skilled in the relevant art, processor 1004 may also be a single processor in a multi-core/multiprocessor system, such system operating alone, or in a cluster of computing devices operating in a cluster or server farm. Processor 1004 is connected to a communication infrastructure 1006, for example, a bus, message queue, network, or multi-core message-passing scheme.

Computer 1000 can include a main memory 1008, for example, random access memory (RAM), and may also include a secondary memory 1010. Secondary memory 1010 may include, for example, a hard disk drive 1012, or removable storage drive 1014. Removable storage drive 1014 may include a floppy disk drive, a magnetic tape drive, an optical disk drive, a flash memory, a Universal Serial Bus (USB) drive, or the like. The removable storage drive 1014 reads from or writes to a removable storage unit 1018 in a well-known manner. Removable storage unit 1018 may include a floppy disk, magnetic tape, optical disk, etc. which is read by and written to by removable storage drive 1014. As will be appreciated by persons skilled in the relevant art, removable storage unit 1018 includes a computer usable storage medium having stored therein computer software or data.

Computer 1000 may include a display interface 1002 (which can include input and output devices such as keyboards, mice, etc.) that forwards graphics, text, and other data from communication infrastructure 1006 (or from a frame buffer not shown) for display on a display unit 1030 (e.g., display screen, electronics of the dynamic input blocks, etc.).

In implementations, secondary memory 1010 may include other similar means for allowing computer programs or other instructions to be loaded into computer 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer 1000.

Computer 1000 may also include a communication interface 1024. Communication interface 1024 allows software and data to be transferred between computer 1000 and other devices, such as communication between any of input blocks, display screen, node, or other supplemental devices. Communication interface 1024 may include a modem, a network interface (such as an Ethernet card), a communication port, a PCMCIA slot and card, or the like. Software and data transferred via communication interface 1024 can be in the form of signals, which can be electronic, electromagnetic, optical, or other signals capable of being received by communication interface 1024. These signals can be provided to communication interface 1024 via a communication path 1026. Communication path 1026 carries signals and can be implemented using wire or cable, fiber optics, a phone line, a cellular phone link, an RF link or other communication channels.

In this document, the terms "non-transitory computer readable medium" "computer program medium" and "computer usable medium" can refer to media such as removable storage unit 1018, removable storage unit 1022, and a hard disk installed in hard disk drive 1012. Computer program medium and computer usable medium may also refer to memories, such as main memory 1008 and secondary memory 1010, which can be memory semiconductors (e.g. DRAMs, etc.).

Computer programs (also called computer control logic) or databases are stored in main memory 1008 or secondary memory 1010. Computer programs may also be received via communication interface 1024. Such computer programs, when executed, enable computer 1000 to implement the embodiments as discussed herein. In particular, the computer programs, when executed, enable processor 1004 to implement the processes of the embodiments discussed here. Accordingly, such computer programs represent controllers of computer 1000. Where the embodiments are implemented using software, the software can be stored in a computer program product and loaded into computer 1000 using removable storage drive 1014, interface 1020, and hard disk drive 1012, or communication interface 1024.

Embodiments of the inventions also can be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon interaction with product showcase systems that their personal information data will be accessed and then reminded again just before personal information data is accessed by the product showcase system.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A display fixture for showcasing products in a retail environment comprising:
   a display surface;
   dynamic input blocks disposed along the display surface; and
   a display screen positioned on the display surface next to the dynamic input blocks;
   wherein each of the dynamic input blocks displays content associated with a product,
   wherein in response to a user interaction with one of the dynamic input blocks, the display screen displays content related to the product associated with the content displayed by the one dynamic input block, and
   wherein the content and associated products displayed on the dynamic input blocks automatically change in response to an external input.

2. The display fixture of claim 1, wherein the content and associated products displayed on the dynamic input blocks are defined by a retailer.

3. The display fixture of claim 1, wherein the external input is a geographical location of the display fixture.

4. The display fixture of claim 1, wherein the external input is user data transmitted from one or more users selected based on their proximity to the display fixture.

5. The display fixture of claim 1, wherein the external input is a ranking of most-downloaded products.

6. The display fixture of claim 1, wherein the dynamic input blocks are in the shape of squares with rounded corners to appear as physical manifestations of application icons of associated products.

7. The display fixture of claim 1, wherein the dynamic input blocks are configured to detect a user touch of the dynamic input blocks, and
   wherein the user interaction is the user touch of the one dynamic input block detected by the one dynamic input block.

8. The display fixture of claim 1, further comprising a camera disposed along the display surface, wherein the user interaction is a gaze towards the one dynamic input block detected by the camera.

9. The display fixture of claim 1, wherein each dynamic input block is associated with a different product that is unique relative to products of at least one other of the other dynamic input blocks.

10. A product showcase system comprising:
    the display fixture of claim 1; and
    an external server comprising digital products,
    wherein each of the dynamic input blocks is configured to direct a user device to the external server to purchase one of the digital products.

11. A display fixture for showcasing digital games in a retail environment comprising:
    dynamic input blocks, each associated with a different digital game, wherein each of the dynamic input blocks displays dynamic content associated with its associated digital game; and
    a display screen positioned next to the dynamic input blocks;
    wherein upon a user selection of one of the dynamic input blocks, the content of the selected dynamic input block changes to second content associated with its associated digital game, and the display screen displays third content associated with the associated digital game, and
    wherein at least one of the dynamic input blocks can be used to control at least a portion of the third content.

12. The display fixture of claim 11, wherein the third content is the associated digital game, and wherein at least one of the dynamic input blocks provides input for playing the associated digital game displayed on the display screen.

13. The display fixture of claim 11, further comprising a video game controller,
    wherein upon the user selection of the selected dynamic input block the digital game associated with the selected dynamic input block is automatically run on the display screen and the controller provides user control of the digital game run on the display screen.

14. The display fixture of claim 11, wherein upon the user selection of the selected dynamic input block the digital game associated with the selected dynamic input block is automatically run on the display screen, content displayed on more than one of the dynamic input blocks changes to content associated with the associated digital game, and the more than one dynamic input blocks provide user control of the digital game run on the display screen.

15. A product showcase system for showcasing products available for purchase in a retail environment comprising:
   a display fixture including a display surface;
   dynamic input blocks that are distinct from one and other and that are disposed along the display surface; and
   a display screen positioned next to the dynamic input blocks,
   wherein each of the dynamic input blocks is associated with a different purchasable product and is configured to display a first content and a second content, wherein the first content and the second content are related to the purchasable product associated with their respective dynamic input block, wherein the first content and the second content are different from each other,
   wherein the first content is a default display of its respective dynamic input block,
   wherein in response to a user interaction with one of the dynamic input blocks, the first content displayed on the interacted-with dynamic input block is replaced with the second content, and
   wherein in response to the user interaction the display screen displays display screen content related to the purchasable product associated with the interacted-with dynamic input block.

16. The product showcase system of claim 15, wherein the first content is an animation associated with an application icon of a digital product, and
   wherein the second content further includes a video associated with the digital product.

17. The product showcase system of claim 15, wherein the dynamic input blocks each comprise:
   a display configured to display the first content and the second content;
   a lens provided over the display; and
   an interface configured to detect user interaction,
   wherein the display of each of the dynamic input blocks is configured to switch from the first content to the second content in response to user interaction detected by the interface.

18. The product showcase system of claim 15, wherein the second content includes a call to action configured to direct a user device to an external server to purchase the purchasable product associated with the interacted with dynamic input block.

19. A product showcase system for showcasing products in a retail environment comprising:
   a display fixture including a display surface;
   dynamic input blocks shaped as buttons and arranged in a matrix along the display surface, wherein each dynamic input block includes:
      a display configured to variably display first and second content associated with one or more of the products in response to user interaction;
      a lens that protrudes through and out from the display surface such that a perimeter face of the lens is visible, wherein the perimeter face is configured to emit light to highlight the respective dynamic input block; and
      a sensor configured to detect the user interaction; and
   a display screen positioned on the display surface next to the matrix, wherein the display screen is configured to display content related to the one or more products associated with the dynamic input blocks.

20. The product showcase system of claim 19, wherein the matrix includes a first matrix and a second matrix and the display screen is positioned between the first matrix and the second matrix.

21. The product showcase system of claim 19, wherein the display surface is a rear wall of a bay.

22. The product showcase system of claim 19, wherein the display surface is a top of a table.

23. The product showcase system of claim 19, wherein the matrix includes rows and columns of spaced apart dynamic input blocks.

24. A method of showcasing products comprising:
   displaying main content on a display screen of a display fixture;
   displaying multiple different secondary contents on multiple dynamic input blocks of the display fixture;
   sensing user input relative to a selected one of the dynamic input blocks;
   changing, in response to the sensed user input, the secondary content on the selected input block from first secondary content to second secondary content associated with the first secondary content; and
   changing, in response to the sensed user input, the main content from first main content to second main content corresponding to the secondary content of the selected dynamic input block.

25. The method of showcasing products of claim 24, wherein sensing user input relative to a selected one of the dynamic input blocks includes sensing, via a sensor of the selected one of the dynamic input blocks, a touching of the selected one of the dynamic input blocks by the user.

26. The method of showcasing products of claim 24, wherein in response to the sensed user input a supplemental device is activated that allows a user to interact directly with content showcased on the selected one of the dynamic input blocks.

27. The method of showcasing products of claim 24, wherein in response to the sensed user input digital content relating to the product showcased on the selected one of the dynamic input blocks is automatically sent to a user device.

\* \* \* \* \*